(12) United States Patent
Ferguson et al.

(10) Patent No.: US 12,422,960 B1
(45) Date of Patent: Sep. 23, 2025

(54) DETERMINING AN UNPROMPTED INPUT

(71) Applicant: Cirque Corporation, Sandy, UT (US)

(72) Inventors: Daniel Ferguson, Herriman, UT (US); Christian Leishman, Bountiful, UT (US); Brian Monson, Farmington, UT (US); Ethan Sturm, Salt Lake City, UT (US); David Taylor, West Jordan, UT (US)

(73) Assignee: Cirque Corporation, Sandy, UT (US)

( * ) Notice: Subject to any disclaimer, the term of this patent is extended or adjusted under 35 U.S.C. 154(b) by 0 days.

(21) Appl. No.: 18/809,924

(22) Filed: Aug. 20, 2024

(51) Int. Cl.
*G06F 3/041* (2006.01)
*G06F 3/044* (2006.01)

(52) U.S. Cl.
CPC ........ *G06F 3/0443* (2019.05); *G06F 3/04166* (2019.05)

(58) Field of Classification Search
None
See application file for complete search history.

(56) References Cited

U.S. PATENT DOCUMENTS

| | | | |
|---|---|---|---|
| 8,604,364 B2 | 12/2013 | Simon | |
| 9,430,147 B2 | 8/2016 | Luo | |
| 11,449,123 B2 | 9/2022 | Li | |
| 11,836,317 B2 | 12/2023 | Yang | |
| 2013/0201155 A1 | 8/2013 | Wu | |
| 2023/0110133 A1 | 4/2023 | Dhar | |

FOREIGN PATENT DOCUMENTS

WO  WO-2006026183 A2 *  3/2006  ........... G06F 1/1616

* cited by examiner

*Primary Examiner* — Duane N Taylor, Jr.

(57) ABSTRACT

A capacitance module may include a set of electrodes, a controller in communication with the set of electrodes, and memory in communication with the controller. The memory may include programmed instructions that cause the capacitance module, when executed, to perform a calibration, the calibration including prompting a finger input, storing a finger attribute of a finger capacitance measurement associated with the finger input, prompting a palm input, storing a palm attribute of a palm capacitance measurement associated with the palm input, and determining an unprompted palm input by consulting at least one of the stored finger attribute and the stored palm attribute.

20 Claims, 22 Drawing Sheets

DETERMINING AN UNPROMPTED INPUT

FIELD OF THE DISCLOSURE

This disclosure relates generally to systems and methods for enhancing touch input accuracy in capacitive touch devices. In particular, this disclosure relates to systems and methods for improving palm rejection and distinguishing between intentional and accidental touch inputs.

BACKGROUND

A touch pad is often incorporated into laptops and other devices to provide a mechanism for giving inputs to the device. One issue with capacitive touch input devices is the unintentional activation caused by accidental touches, particularly from the palm of the hand. This may occur when the device mistakenly interprets the palm resting on the touch surface as a deliberate input. Such accidental touches can lead to unintended actions, which can be frustrating for users and degrade the overall user experience.

Existing methods for palm rejection often rely on processes, such as ignoring large touch areas or inputs detected near the edges of the touch surface. While these methods can reduce the frequency of accidental touches, they are not always effective, especially in complex usage scenarios. Additionally, these approaches may fail to accurately differentiate between intentional and accidental touches, leading to either missed inputs or false activations.

An example of palm rejection is disclosed in U.S. Pat. No. 11,886,699 issued to Wayne Carl Westerman. The selective rejection of touch contacts in an edge region of a touch sensor panel is disclosed. In addition, by providing certain exceptions to the rejection of edge contacts, the functionality of the touch sensor panel can be maximized. Contacts in edge bands around the perimeter of a touch sensor panel can be ignored. However, if a contact in the edge band moves beyond a threshold distance or speed, it can be recognized as part of a gesture. To accommodate different finger sizes, the size of the edge band can be modified based on the identification of the finger or thumb. Furthermore, if contacts in the center region of a touch sensor panel track the movement of contacts in the edge band, the contacts in the edge band can be recognized as part of a gesture.

Another example of palm rejection is disclosed in U.S. Pat. No. 6,246,395 issued to Gregg S. Goyins, et al. This reference discloses a method and apparatus for categorizing substantially simultaneous inputs to a touchscreen. The method is described within a computer device having a display screen adapted to receive touchscreen input. In a first step, the display screen is divided into a plurality of sectors. Next, the sectors are sequentially scanned for input. When a plurality of substantially simultaneous inputs are sensed in respective sectors, the location by sector of each input is ascertained. A unique value is then assigned to each input received, the assigned values corresponding to the sequence in time of the respective inputs based upon the sequentially scanned sectors in which the inputs occurred. The apparatus includes a display screen adapted to receive touchscreen input. A touchscreen driver/sensor is provided to divide the display screen into a plurality of sectors and to sense input in each of the sectors. A sequence counter is used to actuate the driver/sensor to scan the display screen sectors sequentially and at predetermined intervals for input, and to assign a unique value to each input received.

An example of classifying touch type is disclosed in U.S. Pat. No. 11,175,698 issued to Christopher Harrison. This reference includes a method for sensing touch inputs to a digital equipment is provided, comprising the steps of sensing a sound/vibration signal generated by a touch, digitally processing the sensed sound/vibration signal, and determining the type of touch means that has generated the touch and the intensity of the touch based on the properties of the processed sound/vibration signal, wherein the properties include at least one of the following properties of the sound/vibration signal in time domain: maximum amplitude, average amplitude, average frequency, mean, standard deviation, standard deviation normalized by overall amplitude, variance, skewness, kurtosis, sum, absolute sum, root mean square (RMS), crest factor, dispersion, entropy, power sum, center of mass, coefficients of variation, cross correlation, zero-crossings, seasonality, DC bias, or the above properties computed for the first, second, third or higher order of derivatives of the sound/vibration signal; and the following properties of the sound/vibration signal in frequency domain: spectral centroid, spectral density, spherical harmonics, total average spectral energy, band energy ratios for every octave, log spectral band ratios, linear prediction-based cepstral coefficients (LPCCs), perceptual linear prediction (PLP) cepstral coefficients, mel-frequency cepstral coefficients, frequency topology, or the above properties computed for the first, second, third or higher order of derivatives of a frequency domain representation of the sound/vibration signal. There is also provided a device for sensing touch inputs.

Each of these references are herein incorporated by reference for all that they disclose.

SUMMARY

In one embodiment, a capacitance module may include a set of electrodes, a controller in communication with the set of electrodes, and memory in communication with the controller. The memory may include programmed instructions that cause the capacitance module, when executed, to perform a calibration, the calibration including prompting a finger input, storing a finger attribute of a finger capacitance measurement associated with the finger input, prompting a palm input, storing a palm attribute of a palm capacitance measurement associated with the palm input, and determining an unprompted palm input by consulting at least one of the stored finger attribute and the stored palm attribute. The finger attribute may be selected from the group consisting of a finger dimension attribute, a finger movement attribute, a finger signal attribute, and a finger image attribute. The palm attribute may be selected from the group consisting of a palm dimension attribute, a palm movement attribute, a palm signal attribute, and a palm image attribute.

The calibration may further include prompting a thumb input and storing a thumb attribute of a thumb capacitance measurement associated with the thumb input.

Determining the unprompted palm input may include consulting at least one of the stored finger attribute, the thumb attribute, and the stored palm attribute.

The thumb attribute may be classified as a finger attribute.

The thumb attribute may be used to modify the finger attribute.

The calibration may further include prompting a proximity input and storing a proximity capacitance attribute of a proximity capacitance measurement associated with the proximity input, where determining the unprompted palm input includes consulting at least one of the stored finger attribute, the proximity attribute, and the stored palm attribute.

The proximity prompt may be selected from the group consisting of a finger proximity input, a thumb proximity input, and a palm proximity input.

The calibration may further include prompting a subsequent finger input and using a subsequent finger attribute of a subsequent finger capacitance measurement associated with the prompted subsequent finger input to modify the stored finger input.

The calibration may further include prompting a subsequent palm input and using a subsequent palm attribute of a subsequent palm capacitance measurement associated the prompted subsequent palm input to modify the stored palm input.

The finger attribute may be a finger length.
The finger attribute may be a finger width.
The finger attribute may be a finger surface area.
The palm attribute may be a palm length.
The palm attribute may be a palm width.
The palm attribute may be a palm surface area.

Creating the finger attribute may include using a finger machine learning model and training the finger machine learning model with multiple finger capacitance measurements from prompted finger inputs. Creating the palm attribute may include using a palm machine learning model and training the palm machine learning model with multiple palm capacitance measurements from prompted palm inputs.

The programmed instructions may cause the controller to prompt a typing input and store a typing attribute of a typing capacitance measurement associated with the typing input.

Determining the unprompted palm input may include consulting at least one of the stored finger attribute, the stored typing attribute, and the stored palm attribute.

The programmed instructions may cause the controller to record a capacitance measurement associated with the finger input or the palm input and activate a mechanism that induces noise onto an environment associated with the capacitance module while measuring.

In another embodiment, a method for determining a palm input on a capacitance module may include prompting a finger input, storing a finger attribute of a finger capacitance measurement associated with the finger input, prompting a palm input, storing a palm attribute of a palm capacitance measurement associated with the palm input, and determining an unprompted palm input by consulting at least one of the stored finger attribute and the stored palm attribute. The finger attribute may be selected from the group consisting of a finger dimension attribute, a finger movement attribute, a finger signal attribute, and a finger image attribute. The palm attribute may be selected from the group consisting of a palm dimension attribute, a palm movement attribute, a palm signal attribute, and a palm image attribute.

The method may further include prompting a thumb input and storing a thumb attribute of a thumb capacitance measurement associated with the thumb input, wherein determining the unprompted palm input includes consulting at least one of the stored finger attribute, the stored palm attribute, and the stored thumb attribute.

In another embodiment, a computer-program product for determining a palm input on a capacitance module may include a non-transitory computer-readable medium storing instructions executable by a controller to prompt a finger input, store a finger attribute of a finger capacitance measurement associated with the finger input, prompt a palm input, store a palm attribute of a palm capacitance measurement associated with the palm input, and determine an unprompted palm input by consulting at least one of the stored finger attribute and the stored palm attribute. The finger attribute may be selected from the group consisting of a finger dimension attribute, a finger movement attribute, a finger signal attribute, and a finger image attribute. The palm attribute may be selected from the group consisting of a palm dimension attribute, a palm movement attribute, a palm signal attribute, and a palm image attribute.

The medium may store further instructions executable by a controller to prompt a thumb input and store a thumb attribute of a thumb capacitance measurement associated with the thumb input, where determining the unprompted palm input includes consulting at least one of the stored attribute, the stored palm attribute, and the stored thumb attribute.

Figure 1:
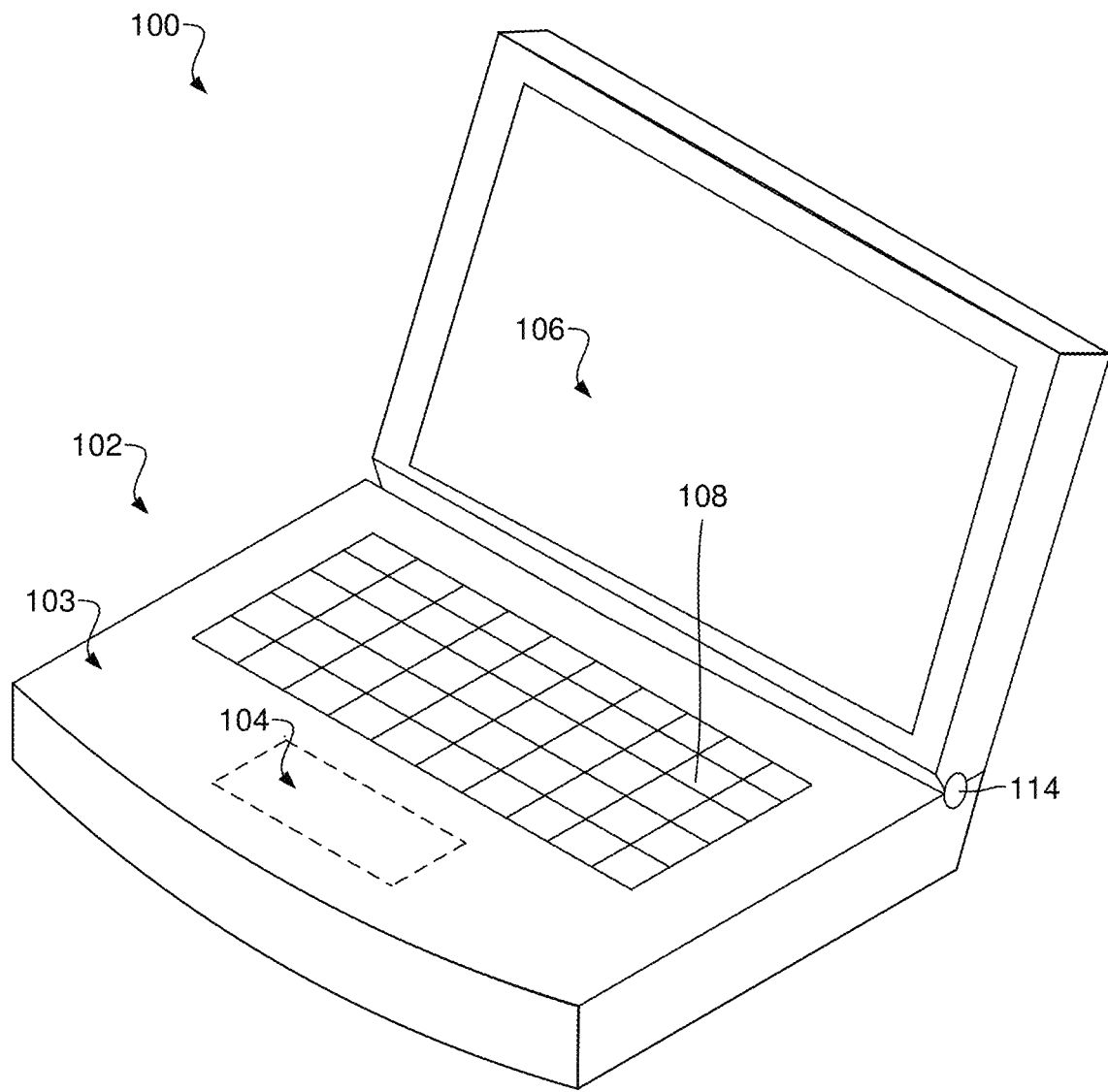
FIG. 1 depicts an example of an electronic device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability, or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "electronic device" may generally refer to devices that can be transported and include a battery and electronic components. Examples may include a laptop, a desktop, a mobile phone, an electronic tablet, a personal digital device, a watch, a gaming controller, a gaming wearable device, a wearable device, a measurement device, a stud finder, an automation device, a security device, a display, a computer mouse, a vehicle, an infotainment system, an audio system, a control panel, another type of device, an athletic tracking device, a tracking device, a card reader, a purchasing station, a kiosk, a button, a slider, or combinations thereof.

It should be understood that use of the terms "capacitance module," "touch pad" and "touch sensor" throughout this document may be used interchangeably with "capacitive touch sensor," "capacitive sensor," "capacitance sensor," "capacitive touch and proximity sensor," "proximity sensor," "touch and proximity sensor," "touch panel," "trackpad," "touch pad," and "touch screen." The capacitance module may be incorporated into an electronic device.

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

In some cases, the capacitance module is located within a housing. The capacitance module may be underneath the housing and capable of detecting objects outside of the housing. In examples, where the capacitance module can detect changes in capacitance through a housing, the housing is a capacitance reference surface. For example, the capacitance module may be disclosed within a cavity formed by a keyboard housing of a computer, such as a laptop or other type of computing device, and the sensor may be disposed underneath a surface of the keyboard housing. In such an example, the keyboard housing adjacent to the capacitance module is the capacitance reference surface. In some examples, an opening may be formed in the housing, and an overlay may be positioned within the opening. In this example, the overlay is the capacitance reference surface. In such an example, the capacitance module may be positioned adjacent to a backside of the overlay, and the capacitance module may sense the presence of the object through the thickness of the overlay. For the purposes of this disclosure, the term "reference surface" may generally refer to a surface through which a pressure sensor, a capacitance sensor, or another type of sensor is positioned to sense a pressure, a presence, a position, a touch, a proximity, a capacitance, a magnetic property, an electric property, another type of property, or another characteristic, or combinations thereof that indicates an input. For example, the reference surface may be a housing, an overlay, or another type of surface through which the input is sensed. In some examples, the reference surface has no moving parts. In some examples, the reference surface may be made of any appropriate type of material, including, but not limited to, plastics, glass, a dielectric material, a metal, another type of material, or combinations thereof.

For the purposes of this disclosure, the term "display" may generally refer to a display or screen that is not depicted in the same area as the capacitive reference surface. In some cases, the display is incorporated into a laptop where a keyboard is located between the display and the capacitive reference surface. In some examples where the capacitive reference surface is incorporated into a laptop, the capacitive reference surface may be part of a touch pad. Pressure sensors may be integrated into the stack making up the capacitance module. However, in some cases, the pressure sensors may be located at another part of the laptop, such as under the keyboard housing, but outside of the area used to sense touch inputs, on the side of the laptop, above the keyboard, to the side of the keyboard, at another location on the laptop, or at another location. In examples where these principles are integrated into a laptop, the display may be pivotally connected to the keyboard housing. The display may be a digital screen, a touch screen, another type of screen, or combinations thereof. In some cases, the display is located on the same device as the capacitive reference surface, and in other examples, the display is located on another device that is different from the device on which the capacitive reference surface is located. For example, the display may be projected onto a different surface, such as a wall or projector screen. In some examples, the reference surface may be located on an input or gaming controller, and the display is located on a wearable device, such as a virtual reality or augmented reality screen. In some cases, the reference surface and the display are located on the same surface, but on separate locations on that surface. In other examples, the reference surface and the display may be integrated into the same device, but on different surfaces. In some cases, the reference surface and the display may be oriented at different angular orientations with respect to each other.

For the purposes of this disclosure, the term "dimension attribute" may generally refer to a dimension of the object (e.g., finger, thumb, palm, stylus, etc.) being measured. In some examples, a dimension attribute may include a length, a width, a surface area, a distance between features of the object, a diagonal measurement of an object, a diagonal measurement of a feature of an object, a curvature of an edge of the object, a length of an edge of the object, a cross section of the object, a cross section of a portion of the object, a cross section of a feature of an object, a length of a feature of an object, a length of a central axis of the object, an angular orientation of a central axis of the object, a location of a central axis of a feature of the object, an angular orientation of a feature of the object, another dimension, or combinations thereof. A feature of an object may include a protuberance of an object, a discontinuity of an object, an appendage of an object, another feature, or combinations thereof. A dimension attribute may be a finger dimension attribute, a thumb dimension attribute, a palm dimension attribute, a stylus dimension attribute, a proximity dimension attribute, another type of dimension attribute, or combinations thereof.

For the purposes of this disclosure, the term "movement attribute" may generally refer to a movement of the object (e.g., finger, thumb, palm, stylus, etc.) being measured. In some examples, a dimension attribute may include a distance traveled by the object, a rotation of the object, an angular distance of the object rotated, a nutation of the object, a movement direction of the object, a pattern of movement of the object, a speed of movement of the object, an initial speed of movement of the object, a continuing speed (i.e., a speed after the initial speed) of the object, a scrolling pattern of the object, a duration of movement of the object, a number of cycles of movement of the object within a predetermined time period, a swiping stroke distance, a swiping speed, a swiping angle, a number of swipes, a swiping rotation, a wiggle of the object, a wiggle variation in the object, a stability of the object, a static position of the object, a duration of a static position of the object, a scrolling stroke distance, a scrolling speed, a scrolling angle, a number of scrolling cycles, a scrolling rotation, a curvature of movement, a trajectory of movement, a location of the movement, a zoom stroke distance, a zoom in speed, a zoom out speed, a zoom pinch angle, a number of zoom cycles, a zoom pinch rotation, a curvature of movement of a zoom, a trajectory of a zoom movement, a location of a zoom movement, a difference in speeds between different parts of the object, a difference in angular speeds between different parts of the object, a difference in rotations between different parts of the object, a distal speed of an object, a proximal speed of an object, a rotational velocity of an object, a shape formed by movement of the object, the straightness of a line formed by the movement, a change in length of the object, a change in width of the object, a change in rotation of the object, a change in surface area of the object, a change in a dimension of the object, a change in a shape of the object, a change in a curvature of an edge of the object, a change in central axis position of the object, a change in central axis position of a feature of the object, a change in orientation of the object or feature, a frequency of change in position of the object or feature, a frequency of movement of the object or feature, a change in relative angular position of between features of the object, a change in relative angular position of between central axes of features of the object, another type of movement attribute, or combinations thereof. A movement attribute may be a finger movement attribute, a thumb movement attribute, a palm movement attribute, a stylus movement attribute, a proximity movement attribute, a differential of movement between different parts of an object, a relative movement, an absolute movement, another type of movement attribute, or combinations thereof.

For the purposes of this disclosure, the term "signal attribute" may generally refer to a signal of the capacitance measurement. In some examples, a signal attribute may include a signal strength, a signal duration, a signal amplitude, noise associated with the signal, a pattern of noise accompanying the signal, an interference of the signal, an interference pattern associated with the signal, a resonance of the signal, the frequency of the signal, a polarity of the signal, a reflection of the signal, a voltage of the signal, a change in signal strength of the signal over time, a change in frequency of the signal over time, a change in amplitude of the signal over time, a change in polarity of the signal over time, another change of the signal over time, a peak of the signal, an edge of the signal, a processed signal attribute, an analog signal attribute, another signal attribute, or combinations thereof.

For the purposes of this disclosure, the term "image attribute" may generally refer to an image of the object (e.g., finger, thumb, palm, stylus, etc.) being measured. In some examples, a image attribute may include an image length, an image width, an image surface area, a distance between features of the image, an interpolation of the image, a spline of the image, a shape of the spline, a curvature of the spline, a number of knots in the spline, a relative angle between different portions of a spline, a distance between knots of a spline, an image edge attribute, a centroid of the image, a distance between an image edge and an image centroid, a change in signal strength across an image, a location of an edge, a location of a corner of an image, a length of a linear portion of an edge of the image, a location of a linear portion of the edge of the image, a symmetry of an image, an asymmetry of an image, a dimension of an asymmetry of an image, a repeated pattern in the image, a dimension of a segmentation of the image, an image outline, a portion of an image outline, a derivative of an image outline or a portion of an image outline, a number of identification of features of interest in an image, a spacing pattern of features of an image, a spacing distance of features of an image, a density of an image, another image attribute, or combinations thereof.

For the purposes of this disclosure, the term "typing prompt" may generally refer to a prompt to press one or more keys associated with the electronic device that incorporates the capacitance module. In some examples, the key is a slider, a mechanical switch key, a virtual key, a key incorporated into a touch pad, a key incorporated into a touch screen, a key incorporated into a touch surface, or combinations thereof. The prompt may include a request to press or hover over a specific key, a single key, multiple keys at the same time, multiple keys in a specific sequence, or combinations thereof. The prompt may include requesting that a user type a specific alphanumeric letter, type a specific word or phrase, type a specific code, or combinations thereof. The prompt may include a request to type a sequence of keys that typically involves using two hands to type, using a single hand to type, typing on a right-hand side of a keyboard, typing on a left-hand side of a keyboard, typing in a central region of a keyboard, or combinations thereof.

For the purposes of this disclosure, the term "typing attribute" may generally refer to a dimension attribute, a movement attribute, a signal attribute, an image attribute, a proximity attribute, processed attribute, a raw data attribute, another type of attribute, or combinations thereof. In some cases, a typing prompt may cause a user to bring his or her hands, palms, thumbs, and/or near to a capacitance sensor. In such an example, the system may recognize a combination of palm, fingers, and thumbs that may hover over a capacitance reference surface, may rest on a capacitance reference surface, may touch a capacitance reference surface, may be to the side of a capacitance reference surface, or combinations thereof. The act of typing may also cause multiple movements in the fingers, thumbs, and palms that occur at a simultaneously or during overlapping time periods. Thus, the typing attribute may include aspects of attributes from the finger, thumbs, and palms.

In some cases where the capacitance reference surface is distinctly different that the keyboard and are spaced at a distance apart from each other, a typing attribute may be associated with an unintentional user input assuming that the user is typing and not intending to provide a touch or proximity user input through the capacitance sensor. In other examples, such as where the keys are incorporated into a capacitance reference surface, the system may determine that the type inputs are intentional, but that the palm inputs are unintentional. In such a situation, the system may distinguish between which of the inputs are intentional and with of the inputs are unintentional. In such a situation, there may be some inputs that are intentional and unintentional provided into the system at the same time or during overlapping times.

FIG. 1 depicts an example of an electronic device 100. In this example, the electronic device is a laptop. In the illustrated example, the electronic device 100 includes input components, such as a keyboard 102 and a capacitive module, such as a touch pad 104, that are incorporated into a housing 103. The electronic device 100 also includes a display 106. A program operated by the electronic device 100 may be depicted in the display 106 and controlled by a sequence of instructions that are provided by the user through the keyboard 102 and/or through the touch pad 104. An internal battery (not shown) may be used to power the operations of the electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 is a capacitance module that includes a stack of layers disposed underneath the keyboard housing, underneath an overlay that is fitted into an opening of the keyboard housing, or underneath another capacitive reference surface. In some examples, the capacitance module is located in an area of the keyboard's surface where the user's palms may rest while typing. The capacitance module may include a substrate, such as a printed circuit board or another type of substrate. One of the layers of the capacitance module may include a sensor layer that includes a first set of electrodes oriented in a first direction and a second layer of electrodes oriented in a second direction that is transverse the first direction. These electrodes may be spaced apart and/or electrically isolated from each other. The electrical isolation may be accomplished by depositing at least a portion of the electrodes on different sides of the same substrate or providing dedicated substrates for each set of electrodes. Capacitance may be measured at the overlapping intersections between the different sets of electrodes. However, as an object with a different dielectric value than the surrounding air (e.g., finger, stylus, etc.) approach the intersections between the electrodes, the capacitance between the electrodes may change. This change in capacitance and the associated location of the object in relation to the capacitance module may be calculated to determine where the user is touching or hovering the object within the detection range of the capacitance module. In some examples, the first set of electrodes and the second set of electrodes are equidistantly spaced with respect to each other. Thus, in these examples, the sensitivity of the capacitance module is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may also include a capacitance module that is located behind an outside surface of the display 106. As a user's finger or other object approaches the touch sensitive screen, the capacitance module may detect a change in capacitance as an input from the user.

While the example of FIG. 1 depicts an example of the electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, a smart phone, a location sensor, a card reading sensor, another type of electronic device, another type of device, or combinations thereof.

Figure 2:
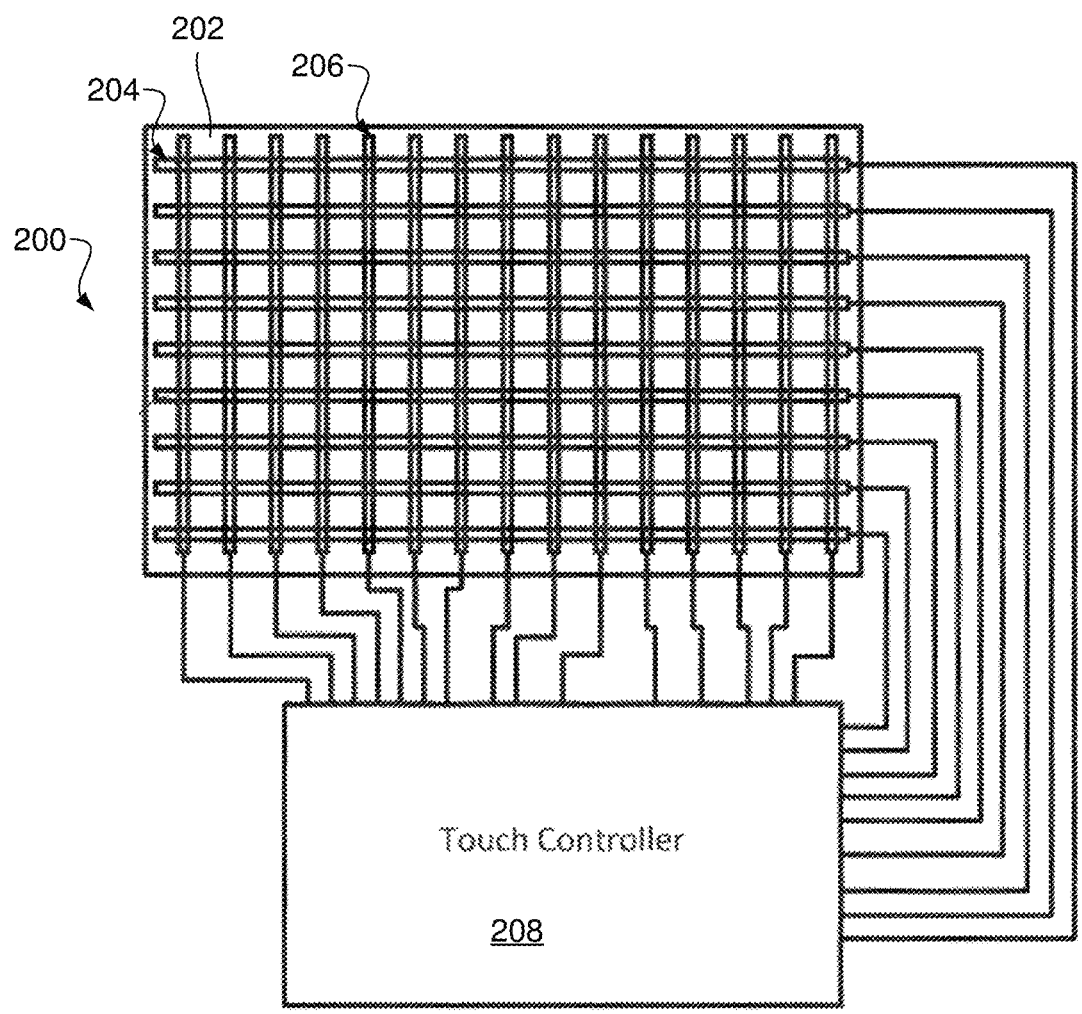
FIG. 2 depicts an example of a substrate with a first set of electrodes and a second set of electrodes in accordance with the disclosure.

FIG. 2 depicts an example of a portion of a capacitance module 200. In this example, the capacitance module 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The capacitance module 200 may include one or more electrodes in the first set 204 or the second set 206. Such a substrate 202 and electrode sets may be incorporated into a touch screen, a touch pad, a location sensor, a gaming controller, a button, and/or detection circuitry.

In some examples, the capacitance module 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the capacitance module 208 includes a capacitance controller 208. The capacitance controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the capacitance controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A shield layer (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the capacitance module 200. The capacitance module 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the capacitance module 200, the capacitance controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the capacitance module 200 having the flexibility of the switching the sets 204, 206 of electrodes between sense and transmit electrodes, in other examples, each set of electrodes is dedicated to either a transmit function or a sense function.

Figure 3:
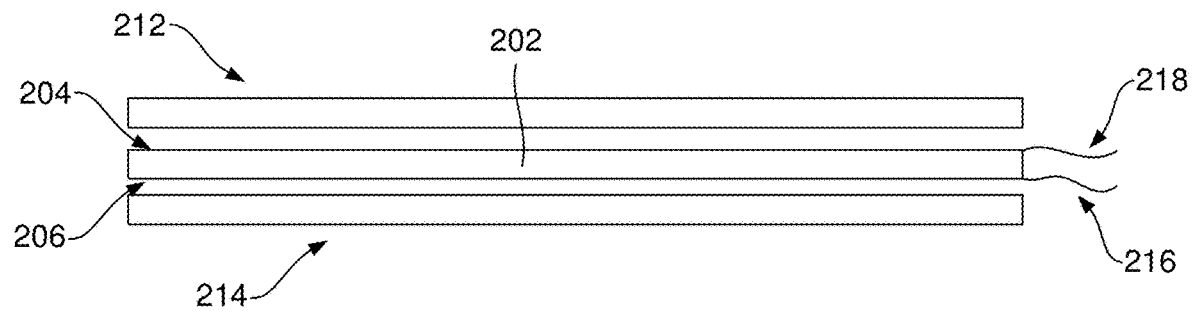
FIG. 3 depicts an example of a touch pad in accordance with the disclosure.

FIG. 3 depicts an example of a substrate 202 with a first set 204 of electrodes and a second set 206 of electrodes deposited on the substrate 202 that is incorporated into a capacitance module. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a capacitance module, the substrate 202 may be located between a capacitance reference surface 212 and a shield 214. The capacitance reference surface 212 may be a covering that is placed over the first side of the substrate 202 and that is at least partially transparent to electric fields. As a user's finger or stylus approach the capacitance reference surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the electronic device. This shield may prevent influence on the electric fields on the substrate 202. In some cases, the shield is solid piece of material that is electrically conductive. In other cases, the shield has a substrate and an electrically conductive material disposed on at least one substrate. In yet other examples, the shield is layer in the touch pad that performs a function and also shields the electrodes from electrically interfering noise. For example, in some examples, a pixel layer in display applications may form images that are visible through the capacitance reference surface, but also shields the electrodes from the electrical noise.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

While the example of FIG. 3 has been depicted as having both sets of electrodes deposited on a substrate, one set of electrodes deposited on a first side and a second set of electrodes deposited on a second side; in other examples, each set of electrodes may be deposited on its own dedicated substrate.

Further, while the examples above describe a touch pad with a first set of electrodes and a second set of electrodes; in some examples, the capacitance module has a single set of electrodes. In such an example, the electrodes of the sensor layer may function as both the transmit and the receive electrodes. In some cases, a voltage may be applied to an electrode for a duration of time, which changes the capacitance surrounding the electrode. At the conclusion of the duration of time, the application of the voltage is discontinued. Then a voltage may be measured from the same electrode to determine the capacitance. If there is no object (e.g., finger, stylus, etc.) on or in the proximity of the capacitance reference surface, then the measured voltage off of the electrode after the voltage is discontinued may be at a value that is consistent with a baseline capacitance. However, if an object is touching or in proximity to the capacitance reference surface, then the measured voltage may indicate a change in capacitance from the baseline capacitance.

In some examples, the capacitance module has a first set of electrodes and a second set of electrodes and is communication with a controller that is set up to run both mutual capacitance measurements (e.g., using both the first set and the second set of electrodes to take a capacitance measurement) or self-capacitance measurements (e.g., using just one set of electrodes to take a capacitance measurement).

Figure 4:
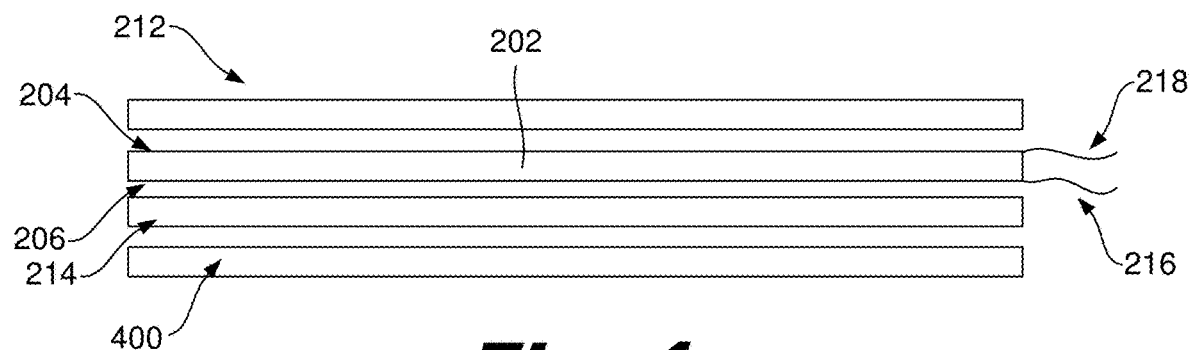
FIG. 4 depicts an example of a touch screen in accordance with the disclosure.

FIG. 4 depicts an example of a capacitance module incorporated into a touch screen. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display layer 400. The display layer 400 may be a layer of pixels or diodes that illuminate to generate an image. The display layer may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 214, the substrate 202, and the capacitance reference surface 212 may all be at least partially optically transparent to allow the image depicted in the display layer to be visible to the user through the capacitance reference surface 212. Such a touch screen may be included in a monitor, a display assembly, a laptop, a mobile phone, a mobile device, an electronic tablet, a dashboard, a display panel, an infotainment device, another type of electronic device, or combinations thereof.

Figure 5:
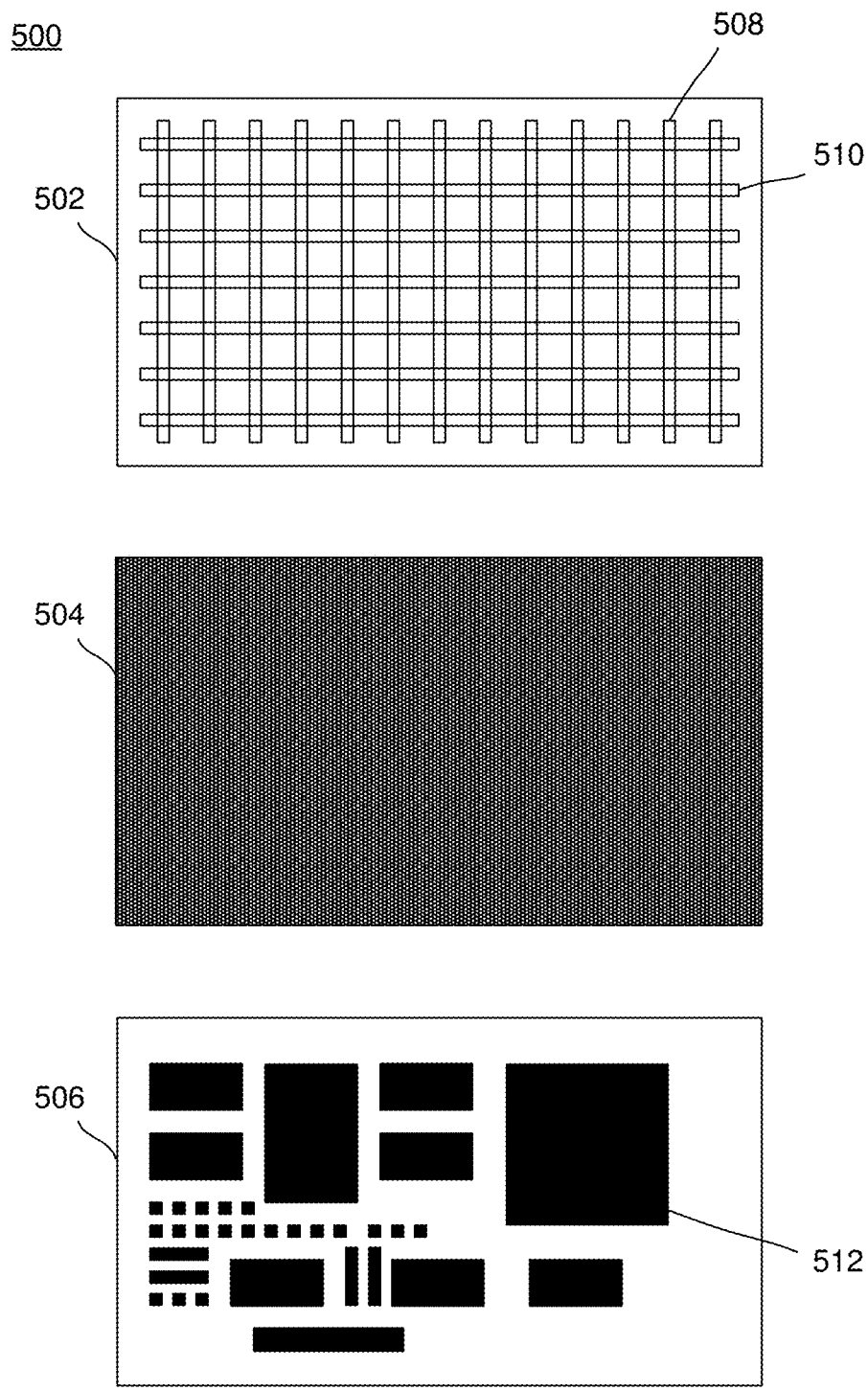
FIG. 5 depicts an example of a capacitance module in accordance with the disclosure.

FIG. 5 depicts an example of a capacitance module 500. In this example, the capacitance module 500 is a stack of three layers, including a sensor layer 502, a shield layer 504, and a component layer 506. While the capacitance module 500 in this example includes three layers, in other examples, a capacitance module may include a different number of layers. For example, a capacitance module may include four layers, five layers, or a different number of layers.

The sensor layer 502 may include a first set 508 of electrodes and a second set 510 of electrodes which may be used in a capacitance circuit to detect and/or measure changes in capacitance. While this example depicts a sensor layer 502 with two sets of electrodes, in other examples, a sensor layer may include one set of electrodes, three sets of electrodes, or a different number of sets of electrodes. While this example depicts a single sensor layer 502, in other examples a capacitance module may include more than one sensor layer.

The first set 508 of electrodes and the second set 510 of electrodes may operate using mutual capacitance, self-capacitance, or combinations thereof. In examples where a sensor layer includes a single set of electrodes, the single set of electrodes may operate using self-capacitance. In other examples, the first and second sets of electrodes are located on different layers.

The shield layer 504 is located adjacent to the sensor layer 502 within the capacitance module 500. In other examples, a shield layer may be in another location relative to other layers in the stack.

The shield layer 504 may include a material which blocks or reduces electromagnetic and/or electrical interference. In some examples, a shield layer may be made of a conductive material such as copper, aluminum, silver, or combinations thereof. In other examples, a shield layer may be a composite material such as plastic, glass, another composite structure, or combinations thereof. In yet other examples, a shield layer may be a shielding material coating applied to a substrate, such as indium tin oxide (ITO), graphene, a conductive polymer, another coating, or combinations thereof. In some cases, a shield layer's material may be a magnetic material, such as iron, ferrite, another metal, composites thereof, alloys thereof, mixtures thereof, or combinations thereof.

In this example, the shield layer 504 is located between the sensor layer 502 and the component layer 506. The shield layer 504 may help prevent electromagnetic interference originating from components 518 on the component layer 506 or sources external to the capacitance module from interfering with the first set 508 and/or second set 510 of electrodes on the sensor layer 502.

Shielding the sensor layer 502 with the shield layer 504 may improve the accuracy and stability of capacitance measurements measured by first set 508 and second set 501 of electrodes. Shielding the sensor layer 502 may also reduce noise, which may increase the sensitivity and accuracy of user inputs on the capacitance module 500. The shield layer 504 may be positioned to block interference from a battery, power sources, memory resources, processing resources, electronic components, other components, or combinations thereof that may be positioned within a cavity of the electronic device.

In this example, the component layer 506 is adjacent to the shield layer 504. In other examples, a component layer may be in another location relative to other layers in a stack or parts of a capacitance module. The component layer 506 includes components 512.

The component layer 506 may include components 512 which facilitate the functionality of the capacitance module 500. Components on a component layer may include a central processing unit (CPU), a microcontroller, an op-amp, a memory unit, a field-programmable gate array (FPGA), a graphics processing unit (GPU), an interface controller, a power management integrated circuit, processing resources, an antenna, another type of component, or combinations thereof.

Figure 6:
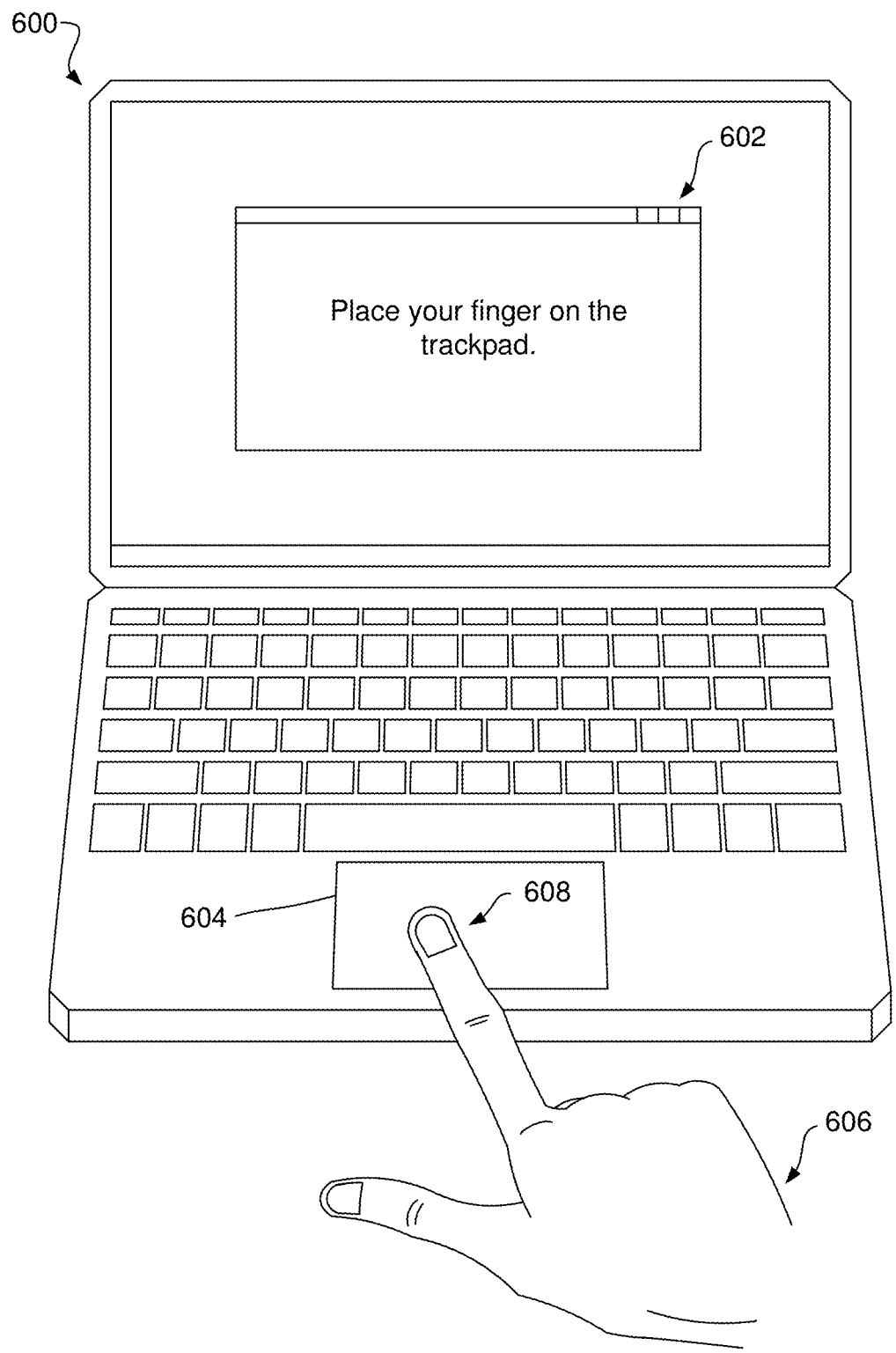
FIG. 6 depicts an example of a personal computer in accordance with the disclosure.

FIG. 6 depicts an example of a personal computer 600 in accordance with the disclosure. In this example, the personal computer 600 is a laptop. The personal computer 600 includes an input device 604 that includes the capacitance module.

During a calibration process, the personal computer 600 may communicate a prompt 602 for user input to a user 606. In this example, the prompt 602 may be communicated to the user 606 by displaying the prompt on the display of the personal computer 600. In other examples, a prompt may be communicated differently. For example, a prompt may be communicated to a user by audio announcement through a speaker or audio interface, by haptic feedback through vibrations and/or tactile sensations, by using lights or LED signals, by text message to a connected device, by some other method of communication, or combinations thereof.

Upon receiving the prompt 602, the user 606 may provide an input 608 to the input device 604. The input 608 may correspond to the prompt 602. In this example, the input 608 is a finger input corresponding to the prompt 602 to place a finger on the trackpad. In other examples, a user may be prompted to provide a different input. In some examples, a user may be prompted to provide a palm input in which they place their palm on a capacitance module. In yet other examples, a user may be prompted to provide a thumb input or another finger input on a capacitance module. In yet other examples, a user may be prompted to provide multiple inputs of digits and/or palms simultaneously. The user may also be directed to place the prompted input onto a certain location of the input device 604. Further, in other examples, the user may be prompted to provide the same input, just rotated at a different angle.

In the depicted example, the input 608 may be a solitary input. In other examples, an input may be a gesture input or combination of gestures. For example, a user may be prompted to provide a proximity gesture in which they place a finger or other input method near a capacitance module without making physical contact with a reference surface. In yet other examples, a user may be prompted to drag a finger from one point on the input device to another point on the input device. In yet other examples, a user may be prompted to drag a finger from one point to another on input device in a rotating motion. In yet other examples, a user may be prompted to rest a finger on the input device for a specified duration of time. In yet other examples, a user may be prompted to provide a combination of gestures such as a drag gesture, rotation gesture, and proximity gesture in sequence. Other combinations of gestures and prompts also exist.

As the user 606 provides the input 608, the input device 604 may record capacitance measurements corresponding to the input. The measurements may include measurements of the input length, input width, input surface area in contact with the input device reference surface, or combinations thereof. The measurements of the input 608 may include a duration element, such as the duration of the contact between the input and the reference surface of the input device 604.

The measurements of user input 608 during the calibration process may be processed and stored in memory resources of the capacitance module. These measurements may form a reference dataset for the corresponding input 608.

After a prompt communication, user input, and measurement recording, a calibration process may repeat these steps to collect measurements and form reference datasets for different types of user inputs. For example, a user may first be prompted to provide a finger input, a palm input, a thumb input, a proximity input, a touch input, a stylus input, another type of input, or combinations thereof.

A finger input may include touching a reference surface of the input device with a finger. In response to detecting a finger input, the input device may record a capacitance signal strength, multiple capacitance signal strengths at select locations corresponding to a finger shape, a finger length, a finger width, multiple finger widths along the length of the finger, a finger shape, a surface area associated the finger, a finger size, another dimension of the finger shape, another attribute associated with the measured signals from the finger input, or combinations thereof.

A palm input may include touching a reference surface of the input device with a palm of the user's hand. In response to detecting a palm input, the input device may record a capacitance signal strength, multiple capacitance signal strengths at select locations corresponding to a palm shape, a palm length, a palm width, multiple palm widths along the length of the palm, multiple palm lengths along the width of the palm, a palm shape, a surface area associated the palm, a palm size, a location of one or more fingers and/or thumbs protruding from the palm, another dimension of the palm shape, another attribute associated with the measured signals from the palm input, or combinations thereof.

A thumb input may include touching a reference surface of the input device with a thumb. In response to detecting a thumb input, the input device may record a capacitance signal strength, multiple capacitance signal strengths at select locations corresponding to a thumb shape, a thumb length, a thumb width, multiple thumb widths along the length of the thumb, a thumb shape, a surface area associated the thumb, a thumb size, another dimension of the thumb shape, another attribute associated with the measured signals from the thumb input, or combinations thereof.

A stylus input may include touching a reference surface of the input device with an end of a stylus. In response to detecting a stylus input, the input device may record a capacitance signal strength, multiple capacitance signal strengths at select locations corresponding to a stylus shape, a stylus length, a stylus width, multiple stylus widths along the length of the stylus, a stylus shape, a surface area associated the stylus, a stylus size, another dimension of the stylus shape, another attribute associated with the measured signals from the stylus input, or combinations thereof. The user may receive a stylus prompt to use the stylus to write a specific alphanumeric symbol, write a specific phrase, sign the user's name, draw a shape, draw an image, draw a line, draw a circle, draw a pattern, make another type of input with the stylus, or combinations thereof.

A proximity input may include hovering over a reference surface of the input device. For example, a proximity finger input may include hovering a finger over the reference surface of the input device without touching the input device. For example, a proximity thumb input may include hovering a thumb over the reference surface of the input device without touching the input device. For example, a proximity palm input may include hovering a palm over the reference surface of the input device without touching the input device. For example, a proximity stylus input may include hovering a stylus over the reference surface of the input device without touching the input device. A proximity prompt may request that the user swipe his or her hand over the reference surface, make a single finger gesture, make multi-finger gesture, make a single-handed gesture, make a multi-handed gesture, may a gesture, move an object horizontally with respect to the reference surface, move the object vertically with respect to the reference surface, make a circular motion, make another type of motion, or combinations thereof.

In response to detecting a proximity input, the input device may record a capacitance signal strength, multiple capacitance signal strengths at select locations corresponding to an input proximate shape, a proximate shape length, a proximate shape width, multiple widths along the length of the proximate shape, a proximate shape, a surface area associated the proximate shape, a proximate shape size, another dimension of the proximate shape, another attribute associated with the measured signals from the proximate input, or combinations thereof.

In some cases, the raw data from the inputs may be stored as the attributes. In other examples, the attributes may include processed data. In some examples, the processed attributes may include average lengths, median lengths, maximum lengths, minimum lengths, lengths within the first standard of deviation, average widths, median widths, maximum widths, minimum widths, widths within the first standard of deviation, average surface areas, median surface areas, maximum surface areas, minimum surface areas, surface areas within the first standard of deviation, average capacitance signal strengths, median capacitance signal strengths, maximum capacitance signal strengths, minimum capacitance signal strengths, capacitance signal strengths within the first standard of deviation, average sizes, median capacitance signal strengths, maximum sizes, minimum sizes, sizes within the first standard of deviation, other processed attributes, or combinations therefore. In some cases, both raw and processed attributes are stored and/or used to compare against the unprompted user inputs.

During operation of the personal computer 600, the input device 604 may classify capacitance inputs by comparing the capacitance inputs with the reference datasets stored in its memory. The comparison may involve evaluating the similarities and differences between the new measurements and the stored attributes. In some examples, the input device 604 may use this analysis to classify an unprompted input as an intentional touch when at least one of the attributes of the of the unprompted input matches or is at least similar to one of the finger attributes. In some examples, the input device 604 may use this analysis to classify an unprompted input as an intentional touch when at least one of the attributes of the of the unprompted input matches or is at least similar to one of the thumb attributes. In some examples, the input device 604 may use this analysis to classify an unprompted input as an accidental touch when at least one of the attributes of the of the unprompted input matches or is at least similar to one of the palm attributes.

In some cases, if the unprompted input closely matches the stored finger attributes, it may be classified as an intentional touch. In other cases, if the unprompted input significantly deviates from the stored finger attributes and/or aligns more closely with stored palm attributes, it may be classified as an accidental touch.

This process of prompting, measuring, storing, and comparing inputs may allow the input device to distinguish between different types of touch inputs and reduce false positives.

Figure 7:
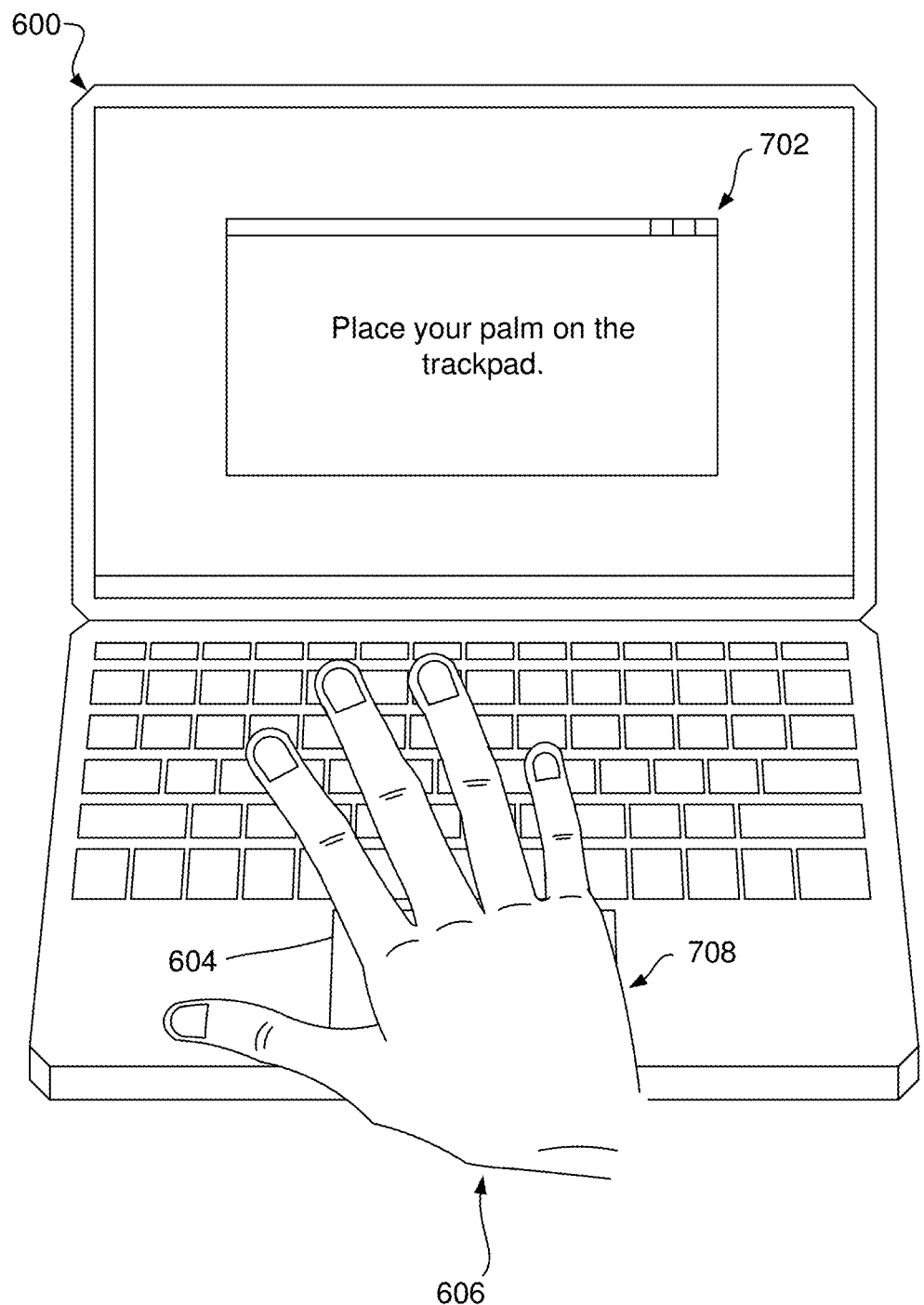
FIG. 7 depicts an example of a personal computer in accordance with the disclosure.

FIG. 7 depicts an example of the personal computer 600 displaying a prompt 702 for the user 606 to provide a palm input 708 on the input device 604 during a calibration process. As the palm input 708 is provided, the input device 604 may measure capacitance values associated with the input, form a reference dataset, and store the dataset in memory resources. During operation of the personal computer 600, unprompted capacitance inputs to the input device 604 may be classified by comparing measurements of the current input to the reference dataset stored in memory.

Figure 8:
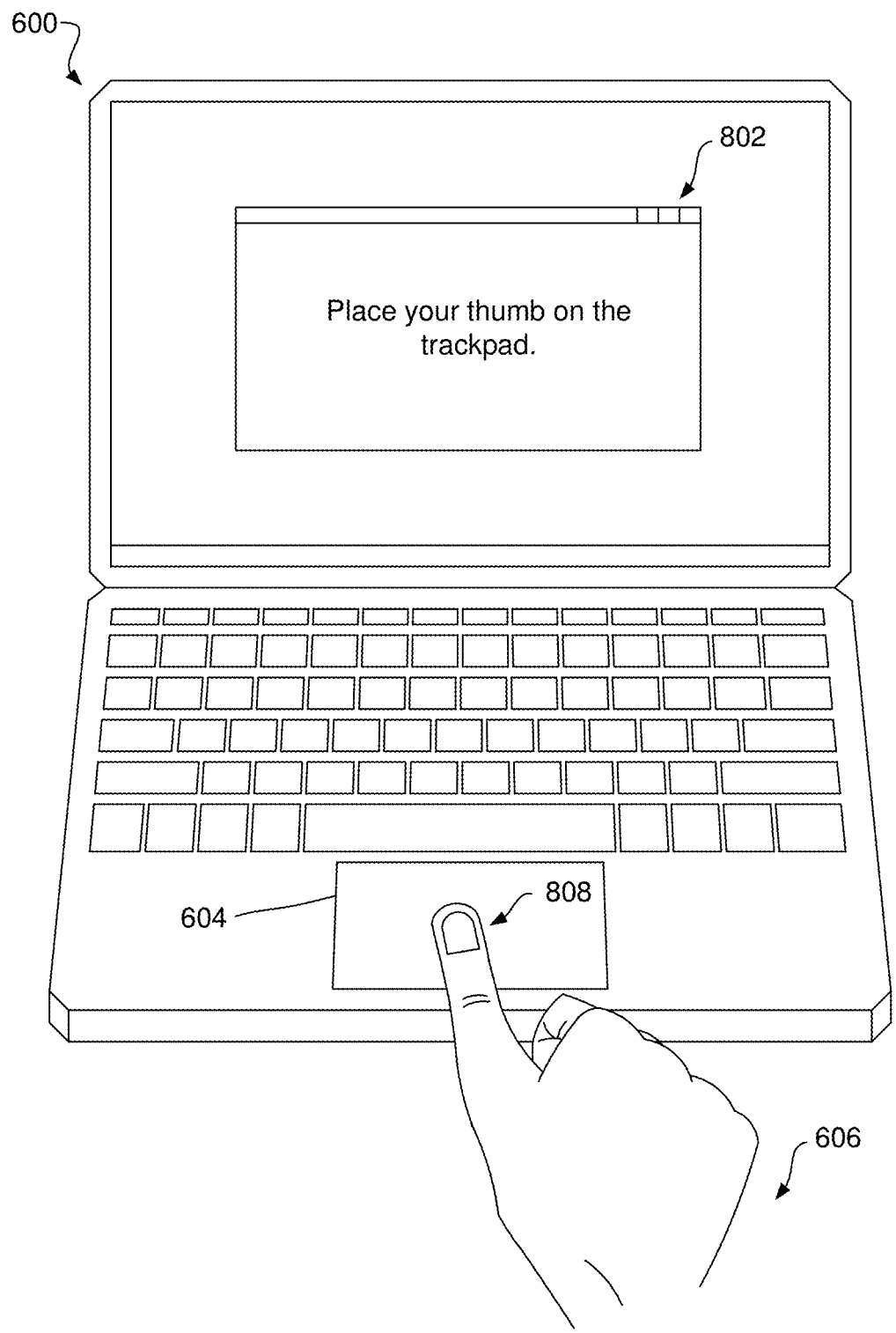
FIG. 8 depicts an example of a personal computer in accordance with the disclosure.

FIG. 8 depicts an example of the personal computer 600. In this example, the personal computer 600 is displaying a prompt 802 for the user 606 to provide a thumb input 808 on the input device 604 during a calibration process.

Figure 9:
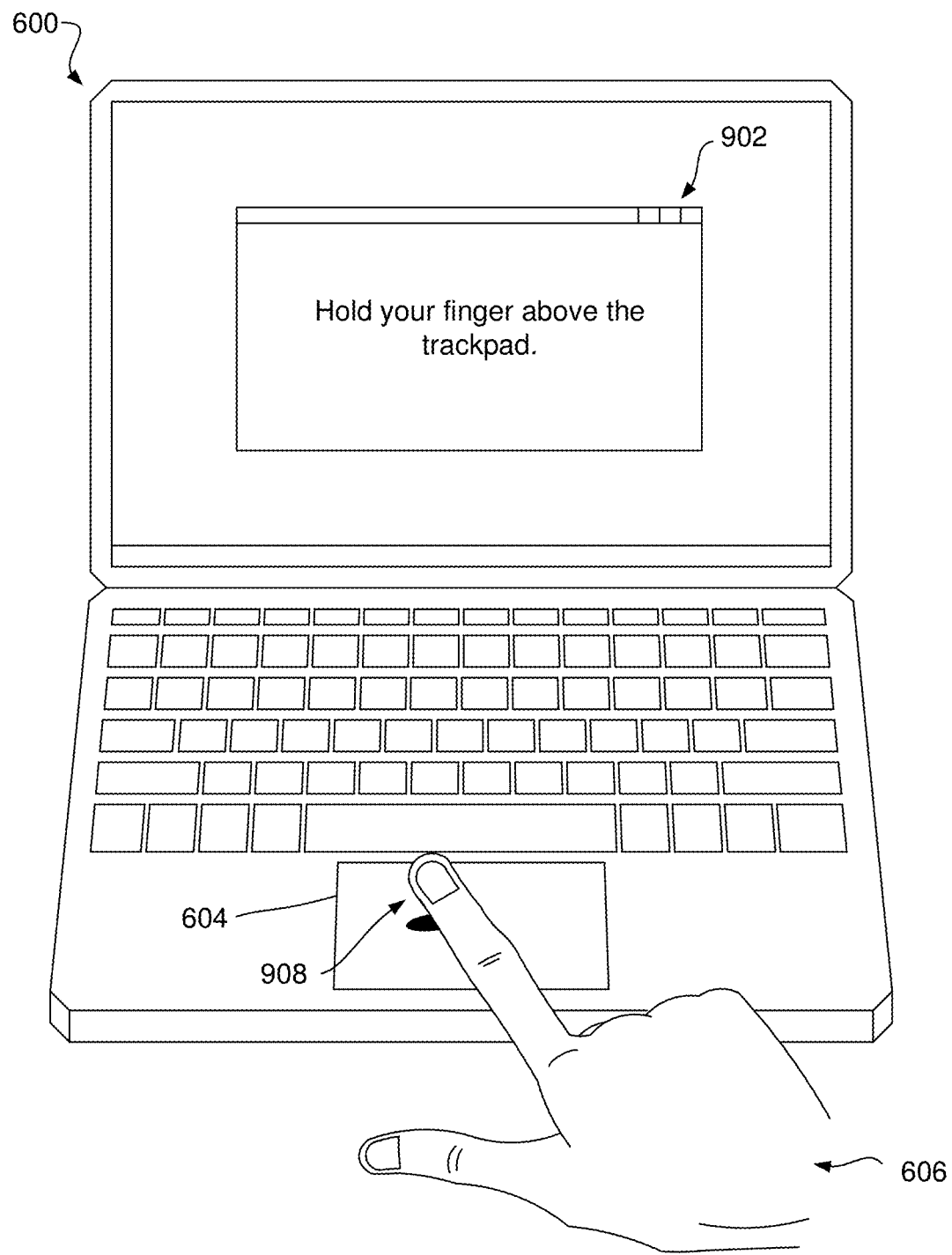
FIG. 9 depicts an example of a personal computer in accordance with the disclosure.

FIG. 9 depicts an example of the personal computer 600. In this example, the personal computer 600 is displaying a prompt 902 for the user 606 to provide a proximity input 908 on the input device 604 during a calibration process. A proximity input may include holding a finger, another digit, or a palm above a capacitance module.

Figure 10:
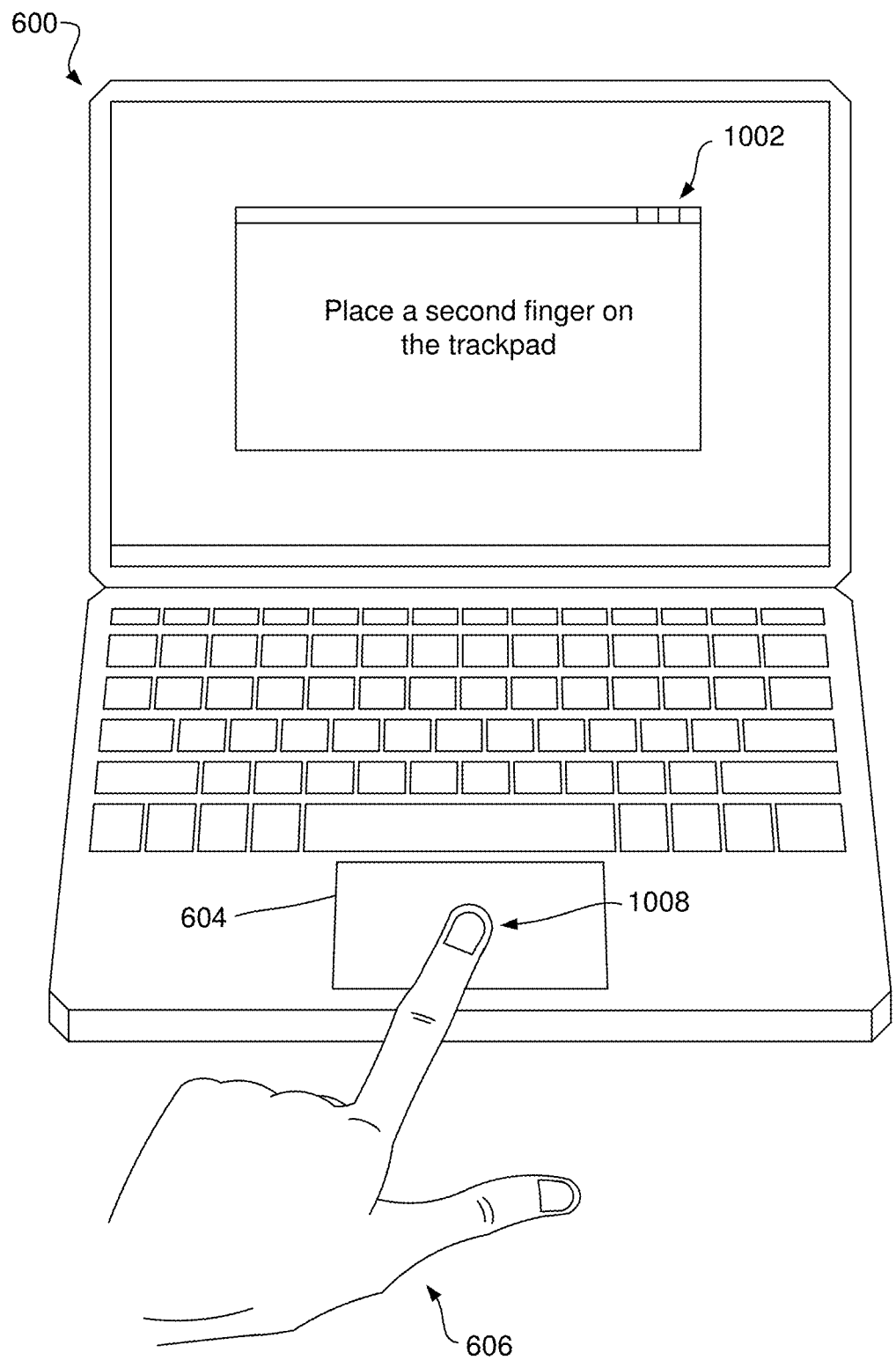
FIG. 10 depicts an example of a personal computer in accordance with the disclosure.

FIG. 10 depicts an example of the personal computer 600. In this example, the personal computer 600 is displaying a prompt 1002 for the user 606 to provide an input 1008 from a second finger on the input device 604 during a calibration process. Providing an input from a second finger may enhance the reference dataset for finger inputs created during a calibration process.

In some cases, the system may request that the user provide a repeat user input during a subsequent prompt. In some cases, this same user input may be at the same location on the user device; the same finger, thumb, or palm; and/or the same orientation. However, in other examples, the subsequent prompt may include prompting the user to make the subsequent input at a different orientation, a different location, with a different finger, with a different thumb, with a different palm, another difference, or combinations thereof.

Figure 11:
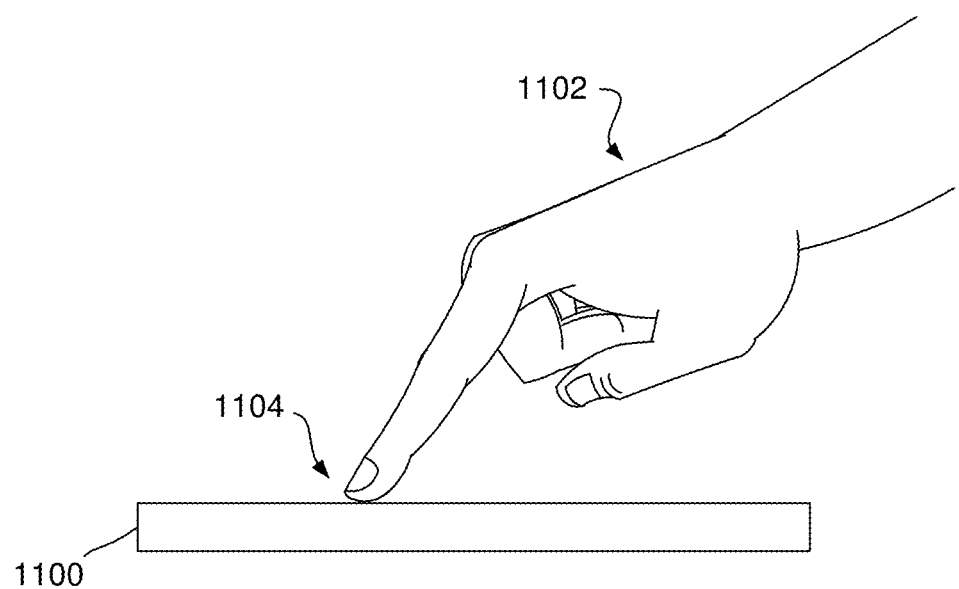
FIG. 11 depicts an example of a capacitance input in accordance with the disclosure.
Figure 12:
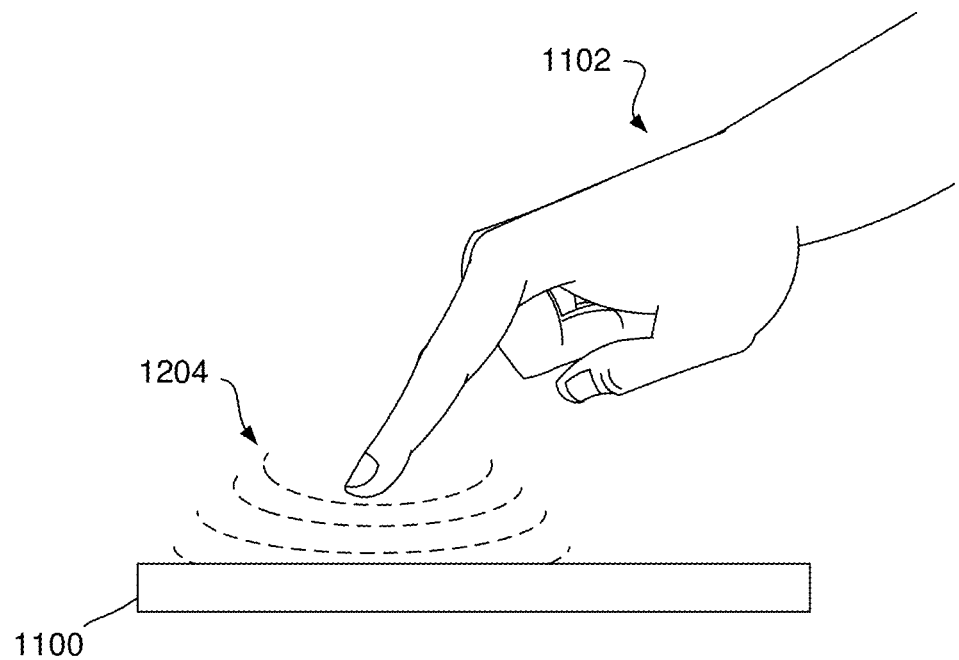
FIG. 12 depicts an example of a capacitance input in accordance with the disclosure.

FIG. 11 depicts an example of a user 1102 providing a physical input 1104 to an input device 1100. FIG. 12 depicts an example of the user 1102 providing a proximity input 1204 to the input device 1100.

A physical input 1104 may involve the user 1102 directly touching the reference surface of the input device 1100, allowing the capacitance module to measure attributes such as the capacitance value, length, width, and surface area of the user's finger. The proximity input 1204 may involve the user 1102 hovering a finger near the reference surface of the input device 1100 without making direct contact, allowing the capacitance module to measure the capacitance changes associated with the finger's presence in proximity to the reference surface.

During a calibration process, both proximity inputs and physical inputs may be useful for several reasons. Capturing physical touch data may ensure that the capacitance module profiles direct interaction characteristics, such as the precise capacitance values when the user's finger, thumb, or palm contacts the reference surface. Recording proximity data may help the capacitance module profile user input without direct contact, which may be for gestures like hovering or near-field interactions. This may help to differentiate between a hovering finger or palm and an actual touch of a finger or palm.

Capturing both proximity inputs and physical inputs may enhance palm detection. By understanding the capacitance signature of a physical touch input, a capacitance module may more accurately differentiate between a deliberate touch and an accidental palm contact. Proximity data may also help the input device 1100 to identify when a palm is near its reference surface but not intended to interact. This may help prevent false positives where the input device 1100 might otherwise mistakenly interpret a hovering palm as a deliberate touch.

Figure 13A:
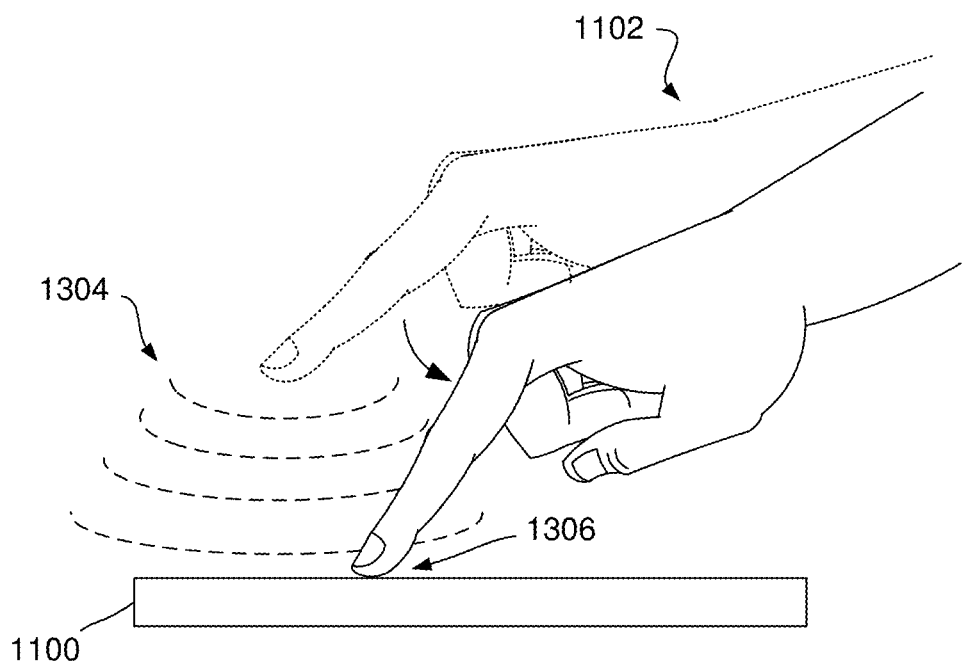
FIG. 13a depicts an example of a capacitance input in accordance with the disclosure.

FIG. 13a depicts an example of the user 1102 interacting with the input device 1100. In this example, the user 1102 is providing a proximity input 1304 which is measured by the input device 1100 at a first time. At a second time, the user 1102 is providing a physical input 1306 which is measured by the input device 1100 at a second time. The user 1102 may interact with the input device 1100 in a single motion which is classified by the capacitance as a proximity input at the first time and a physical input at the second time.

Figure 13B:
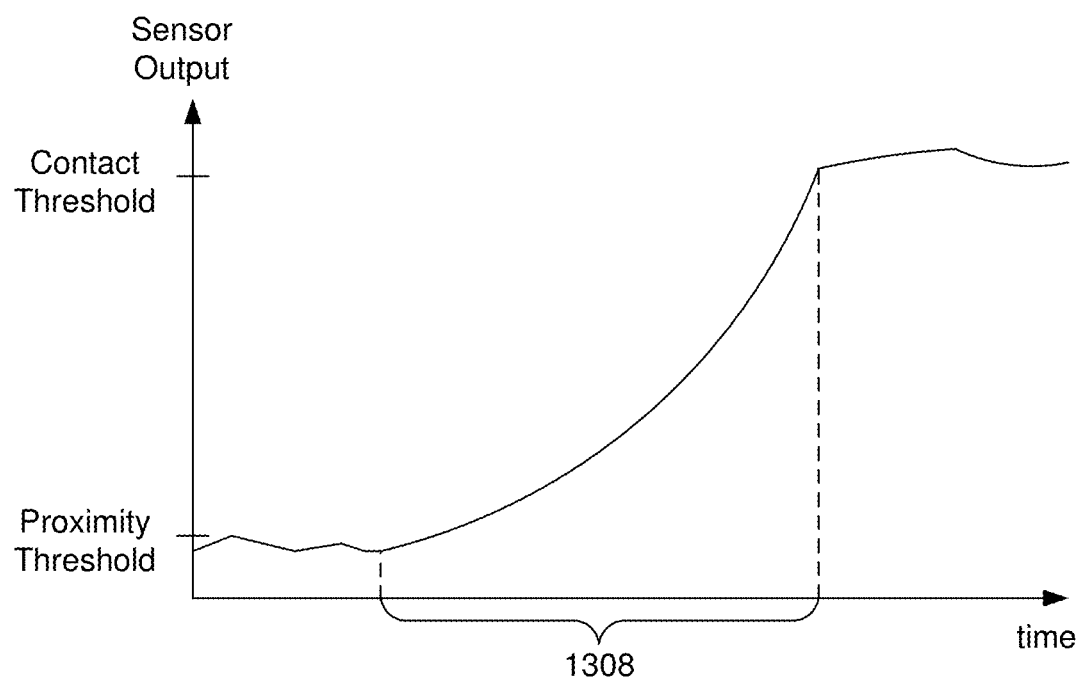
FIG. 13b depicts an example of a time voltage graph in accordance with the disclosure.

FIG. 13b illustrates a graph which shows the sensor output of the input device 1100 over time as it measures the input from the user 1102. The y-axis represents the sensor output, and the x-axis represents time. The graph shows a proximity threshold and a contact threshold on the y-axis.

Initially, as the user's 1102 finger approaches the input device 1100, the sensor output increases gradually, indicating the proximity input 1304. The proximity threshold is the minimum sensor output level at which the input device 1100 can detect the presence of a nearby object, such as the user's 1102 finger. As the user's finger continues to move closer to the input device 1100, the sensor output may continue to increase. When the user's 1102 finger makes physical contact with the reference surface of the input device 1100, the sensor output may reach and surpass the contact threshold. The contact threshold is the sensor output level at which the input device 1100 detects that the user has made physical contact with the reference surface.

The depicted area between the proximity threshold and the contact threshold represents the proximity signal strength 1308. This depicted area may be used to distinguish between hovering inputs and actual touches. In addition to attributes from touch inputs in contact with a capacitance module, the proximity signal attributes may be measured and stored as part of calibration process. By analyzing the proximity signal attributes and the sensor output when the contact threshold is reached, the capacitance module may create a detailed profile of the user's touch characteristics.

In the examples depicted in FIG. 13a and FIG. 13b, the user 1102 input is a proximity input 1304 and physical input 1306 associated with a finger. In other examples, proximity inputs and physical inputs associated with palms, thumbs, and other fingers may be measured during a calibration process to form reference datasets.

Figure 14:
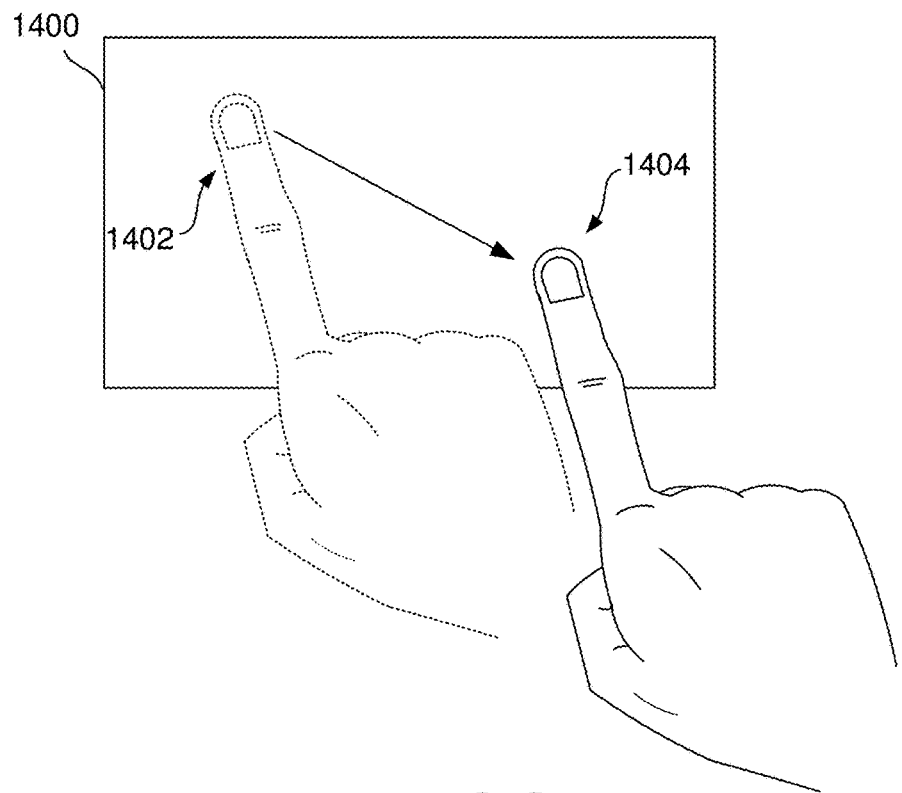
FIG. 14 depicts an example of a capacitance input in accordance with the disclosure.

FIG. 14 depicts an example of a user input on an input device 1400. In this example, a user may perform a gesture input beginning at a first location 1402 on the reference surface of the input device 1400 and ending at a second location 1404 on the reference surface. In this example, the gesture input is a swipe gesture.

As the user performs the swipe gesture, the input device 1400 may take multiple capacitance measurements to capture the dynamic changes in capacitance associated with the gesture. These measurements may include attributes such as the speed, direction, pressure, surface area of the touch, or combinations thereof.

For example, as the user performs the swipe gesture, the input device 1400 may record the location 1402 of the initial touch point, the path of the swipe, and the location of the final touchpoint 1404. This data may help the input device 1400 form a more comprehensive reference dataset for inputs performed with a finger, helping the module 1400 better differentiate between finger inputs and palm inputs.

Figure 15:
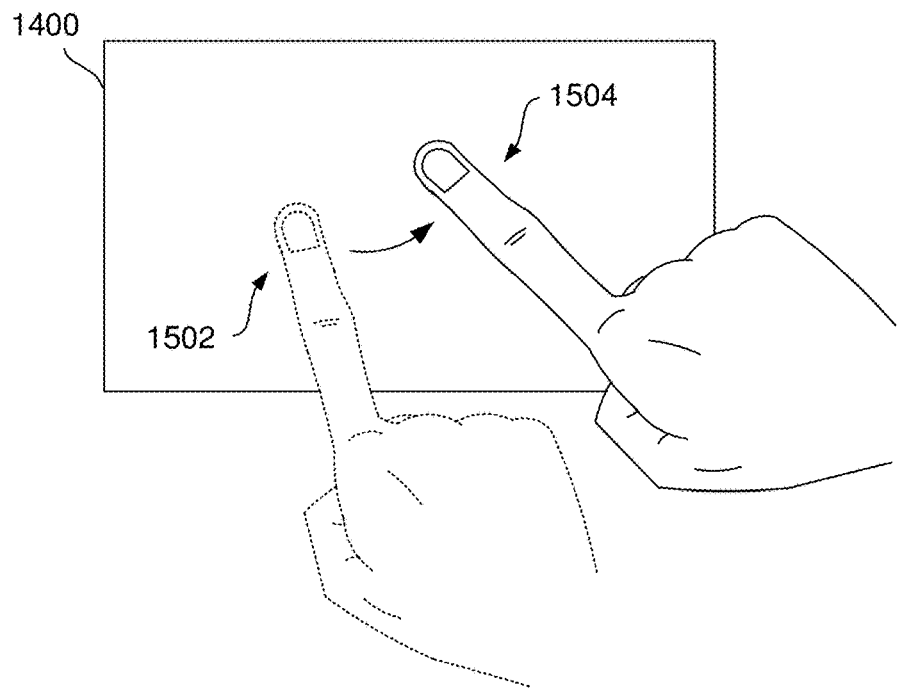
FIG. 15 depicts an example of a capacitance input in accordance with the disclosure.

FIG. 15 depicts an example of a user input on the input device 1400. In this example, the user performs a sliding rotation gesture beginning at a first location 1502 and ending at a second location 1504. As the user performs the sliding rotation gesture, the input device 1400 may take multiple capacitance measurements to capture the dynamic changes in capacitance associated with the gesture.

While the gestures depicted in FIG. 14 and FIG. 15 are swipe and rotation gestures respectively, in other examples, a user may perform a different gesture during a calibration process.

While the gestures depicted in FIG. 14 and FIG. 15 are performed with a user finger, in other examples, gestures performed during a calibration process may be performed with a palm, thumb, another finger, stylus, or combinations thereof. Performing similar gestures with different user inputs may enhance the effectiveness of a capacitance module differentiating between user inputs during operation.

Figure 16A:
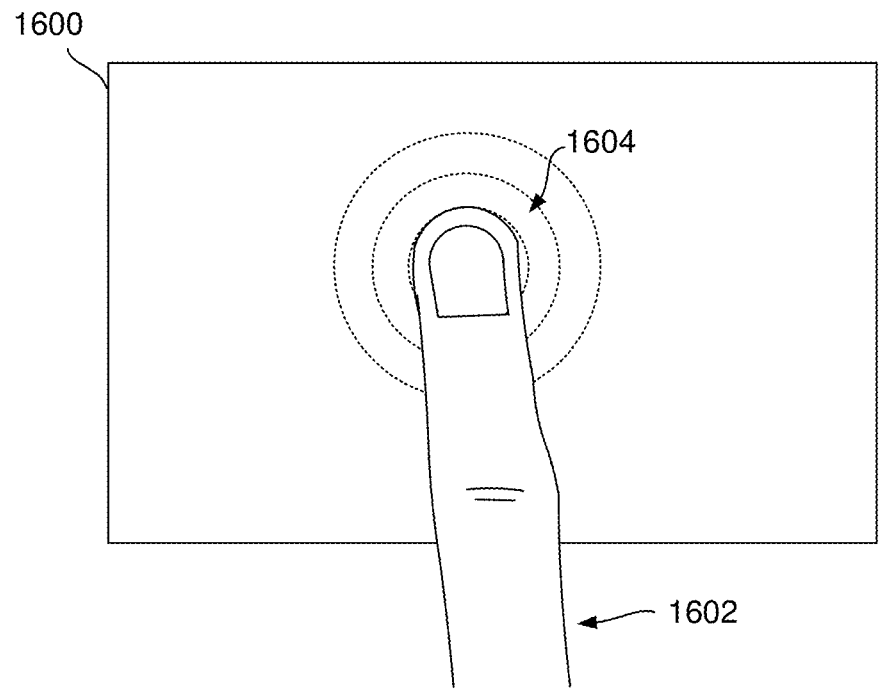
FIG. 16a depicts an example of a capacitance input in accordance with the disclosure.
Figure 16B:
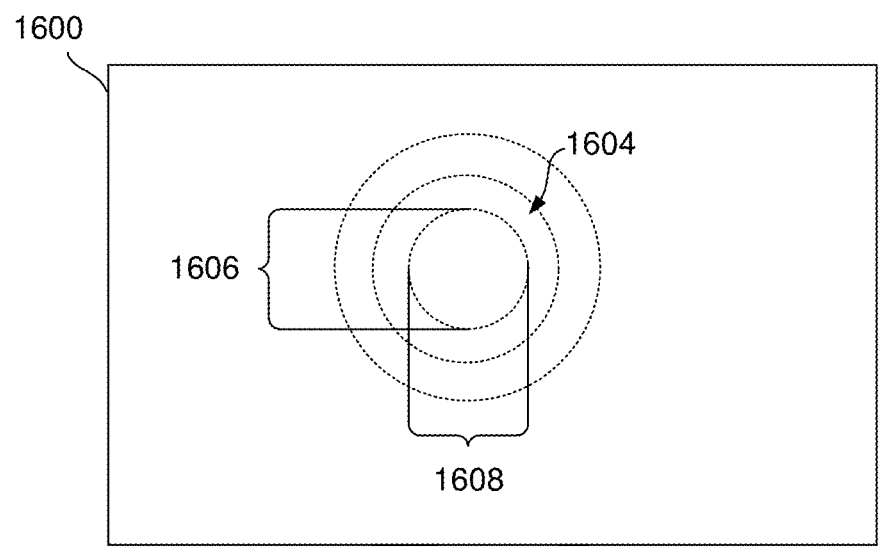
FIG. 16b depicts an example of a capacitance input in accordance with the disclosure.

FIG. 16a depicts an example of user input 1604 on an input device 1600 in accordance with the disclosure. During a calibration process, a user 1602 may be prompted to provide a finger input 1604. FIG. 16b depicts measuring the finger input 1604. The input device 1600 may measure the length 1606 of the user input 1604 as well as the width 1608 of the user input 1604. The length 1606 and width 1604 of the user input may be used to form a reference dataset for the user input, allowing the input device 1600 to better differentiate between user inputs of different types.

The length 1606 and width 1608 of the user input may be processed to calculate a surface area measurement on the reference surface of the input device 1600. The surface area measurement may be used to form a reference dataset for the user input.

Figure 17A:
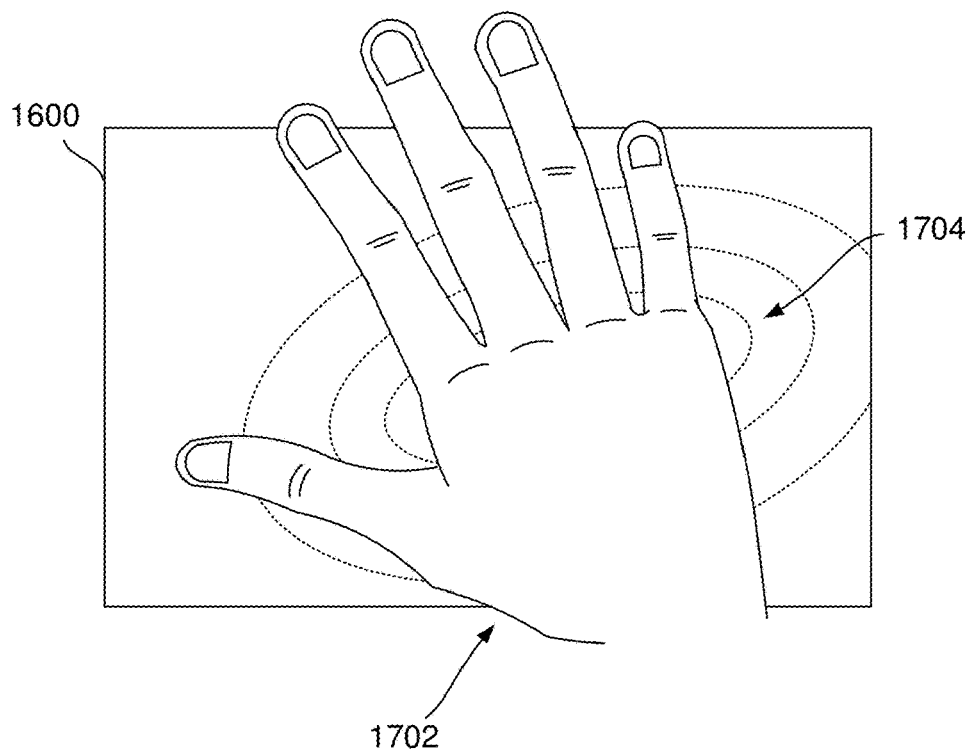
FIG. 17a depicts an example of a capacitance input in accordance with the disclosure.
Figure 17B:
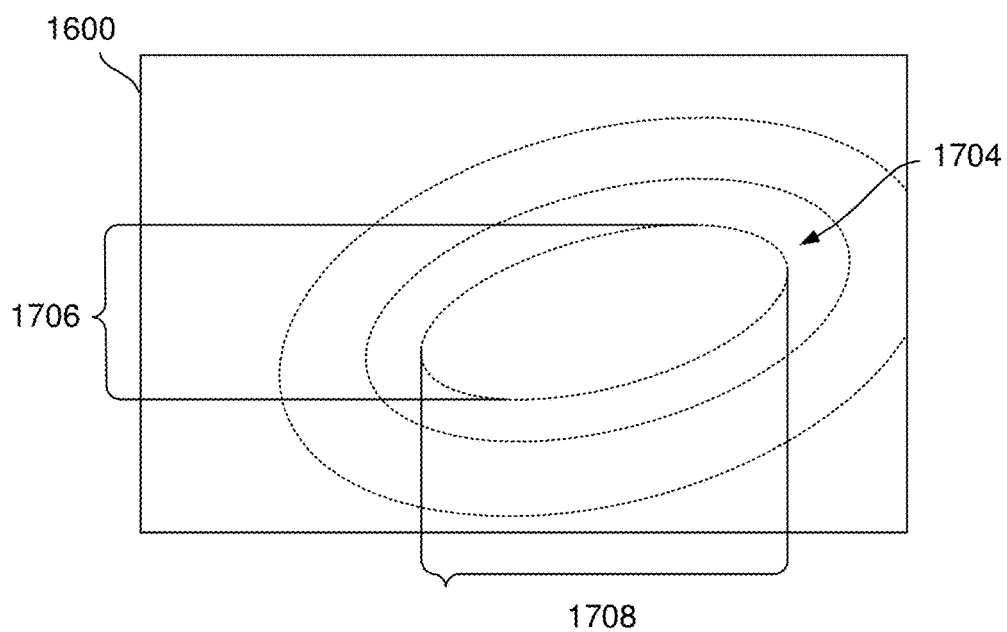
FIG. 17b depicts an example of a capacitance input in accordance with the disclosure.

FIG. 17a depicts an example of user input 1704 on the input device 1600 in accordance with the disclosure. During a calibration process, the user 1602 may be prompted to provide a palm input 1704. FIG. 17b depicts measuring the palm input 1702, which may include a length measurement 1706 and a width measurement 1708. The length measurement 1706 and width measurement 1708 may be processed to calculate a surface area measurement.

During a calibration process, a user may first provide a finger input on an input device, as depicted in FIG. 16a. The finger input may be measured, as depicted in FIG. 16b. Then, a user may provide a palm input on the input device as depicted in FIG. 17a. The palm input may then be measured as depicted in FIG. 17b. Collecting measurements and forming reference datasets for each type of input during a calibration process may enhance a capacitance module's ability to differentiate between input types during normal operation.

Figure 18:
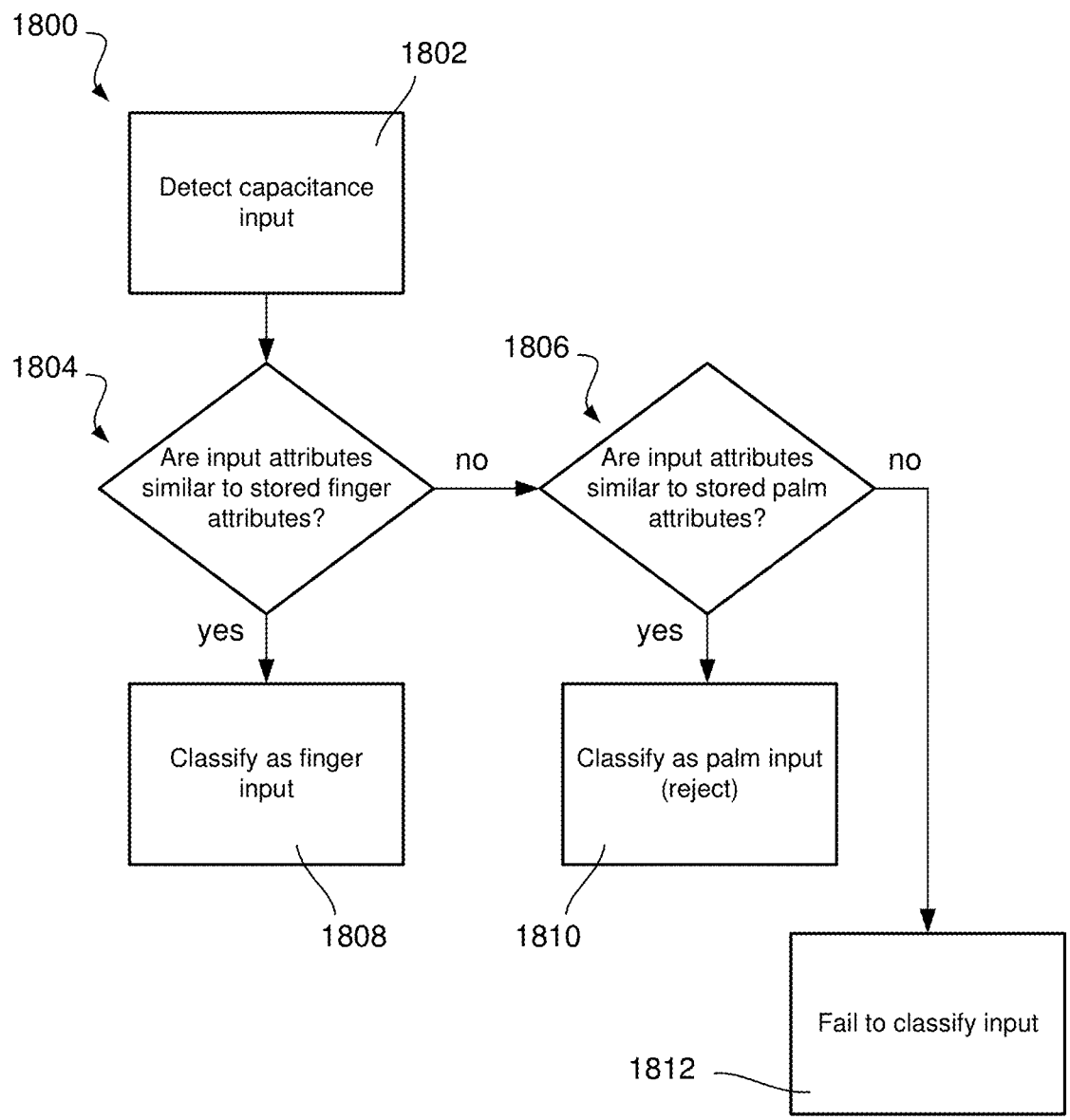
FIG. 18 depicts an example of a method of classifying an input in accordance with the disclosure.

FIG. 18 depicts an example of a method 1800 for classifying an input on a capacitance module. This method 1800 may be performed based on the description of the devices, modules, and principles described in relation to FIGS. 1-17. During operation, a capacitance module may detect 1802 a capacitance input. The capacitance module may make a first determination 1804 whether the input attributes are similar to stored finger attributes collected during a calibration process. If the input attributes are similar to stored finger attributes, the capacitance module may classify 1808 the input as a finger input. If the input attributes are not determined similar to the stored finger attributes, the capacitance module may make a second determination 1806 whether the input attributes are similar to stored palm attributes collected during the calibration process. If the input attributes are similar to stored palm attributes, the capacitance module may classify 1810 the input as a palm input. In some cases, classifying an input as a palm input may result in rejecting the input. If the input attributes are not determined similar to the stored finger attributes or the stored palm attributes, the capacitance module may fail 1812 to classify the input.

In some cases, in response to a determination that an input is an intentional user input, the system may move a cursor or respond to the user's intended input. In some cases, finger inputs and thumb inputs may be classified as intentional input. In some cases, proximity inputs may be classified as intentional inputs. In some cases, proximity inputs may be determined as intentional inputs if certain proximity attributes are also identified. For example, a proximity input that includes an attribute associated with a specific gesture may be recognized as an intentional user input. In some cases, a palm input may be determined as intentional input if certain palm attributes are also identified. For example, a palm input that includes an attribute associated with a specific movement that is recognize as a gesture may be recognized as an intentional user input.

In some cases, in response to a determination that an input is an unintentional user input, the system may ignore the input, reject the input, disable the capacitance sensor for a predetermined amount of time, disable a portion of the capacitance sensor for a predetermined amount of time, change a sensitivity threshold value, fail to rely the user input, provide another response, or combinations thereof. In some cases, any palm input may be determined to be an unintentional user input. In some cases, a proximity input may be determined to an unintentional user input. In some cases, a combination of a proximity input followed by a finger or thumb input may be classified as part of an intentional user input.

In some cases, finger inputs and thumb inputs may be classified as intentional input. In some cases, proximity inputs may be classified as intentional inputs. In some cases, proximity inputs may be determined as intentional inputs if certain proximity attributes are also identified. For example, a proximity input that includes an attribute associated with a specific gesture may be recognized as an intentional user input. In some cases, a palm input may be determined as intentional input if certain palm attributes are also identified. For example, a palm input that includes an attribute associated with a specific movement that is recognize as a gesture may be recognized as an intentional user input.

Figure 19:
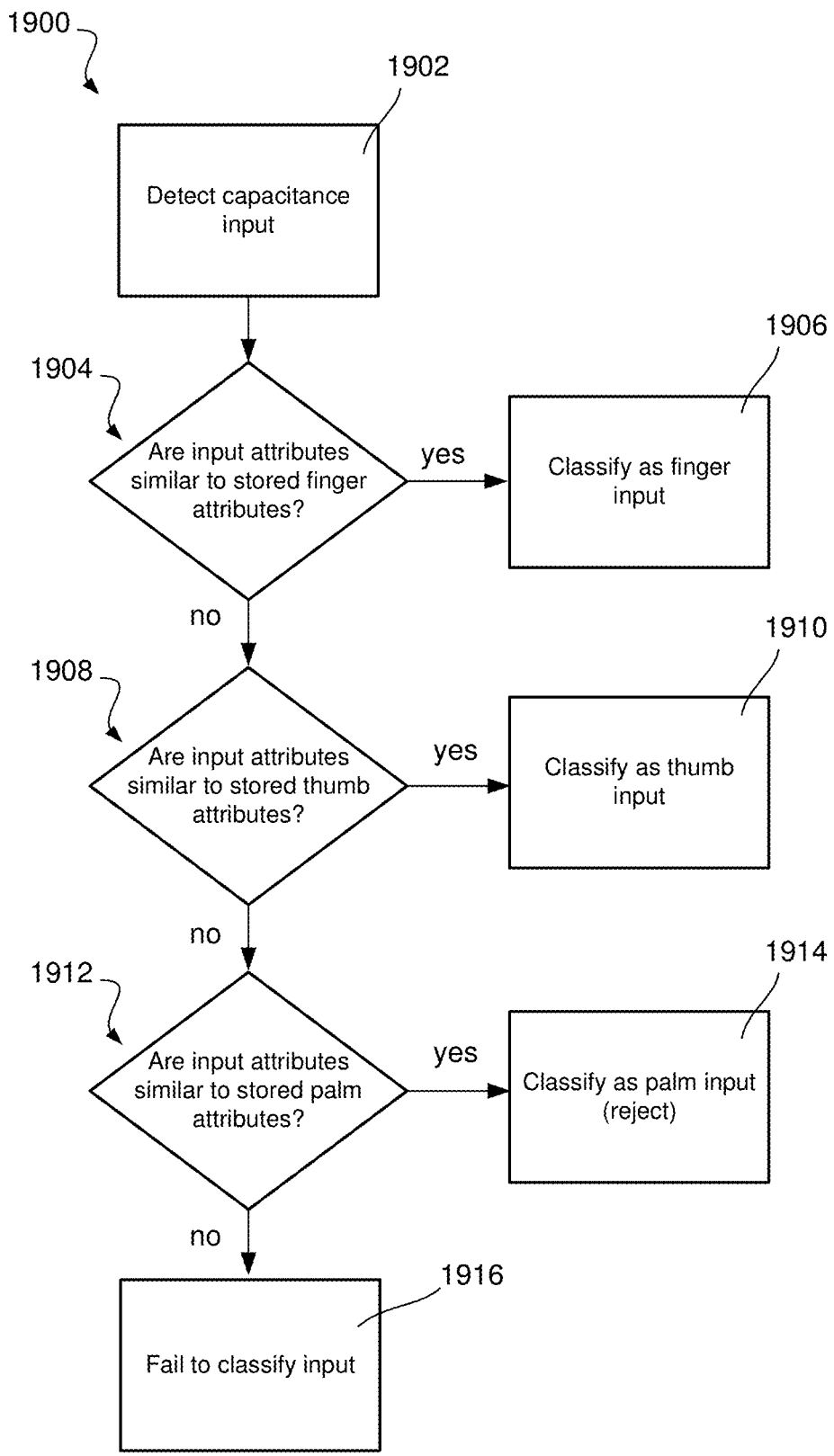
FIG. 19 depicts an example of a method of classifying an input in accordance with the disclosure.

FIG. 19 depicts an example of a decision tree 1900 for classifying an input on a capacitance module. This method 1800 may be performed based on the description of the devices, modules, and principles described in relation to FIGS. 1-17. During operation, the capacitance module may detect 1902 a capacitance input. The capacitance module may make a first determination 1904 whether the input attributes are similar to stored finger attributes collected during a calibration process. If the input attributes are similar to stored finger attributes, the capacitance module may classify 1906 the input as a finger input. If the input attributes are not determined similar to the stored finger attributes, the capacitance module may make a second determination 1908 whether the input attributes are similar to stored thumb attributes collected during the calibration process. If the input attributes are similar to stored thumb attributes, the capacitance module may classify 1910 the input as a thumb input. If the input attributes are not determined similar to the stored thumb attributes, the capacitance module may make a third determination 1912 whether the input attributes are similar to stored palm attributes collected during the calibration process. If the input attributes are similar to stored palm attributes, the capacitance module may classify 1914 the input as a palm input. In some cases, classifying an input as a palm input may mean rejecting the palm input as unintentional. If the input attributes are not determined similar to the stored finger attributes, the stored thumb attributes, or the stored palm attributes, the capacitance module may fail 1916 to classify the input.

During a calibration process, a capacitance module may train machine learning models based on measurements gathered during the calibration process. During operation, inputs to the capacitance module may be passed to the machine learning models, and the inputs may be classified based, at least in part, on the output of the models.

A machine learning model may be a k-nearest-neighbors model, a logistic regression model, a decision tree model, a random forest model, a gradient boosting machine, a support vector machine, a neural network, another machine learning model, or combinations thereof.

In some examples, a machine learning model may be trained and stored on processing resources and memory belonging to a capacitance module itself. In other examples, a machine learning model may be trained and stored on device resources pertaining to a device in electronic communication with a capacitance module.

The capacitance module may cause the calibration process to be initiated when a user sets up his or her profile associated with an electronic device. In some examples, the calibration process may be initiated in response to a user request. In some examples, the calibration process may be initiated in response to an event-based trigger, such as turning on an electronic device, updating software, changing a setting associated with the input device, a program request, a user request, opening a program with the electronic device, updating a user profile, another event-based trigger, or combinations thereof. In some examples, the calibration process may be re-initiated on a reoccurring basis.

In cases where the calibration process is repeated, the datasets gathered from the previous calibration process may be replaced with datasets from the most recent calibration. However, in other examples, the dataset from the most recent calibration may be used to update or refine processed stored attributes. In other examples, the store attributes may include attributes from multiple calibrations.

In some examples, each unique user of an electronic device may have his or his own profile. In such an example, each profile may be associated with a unique dataset having stored attributes unique to each user.

Figure 20:
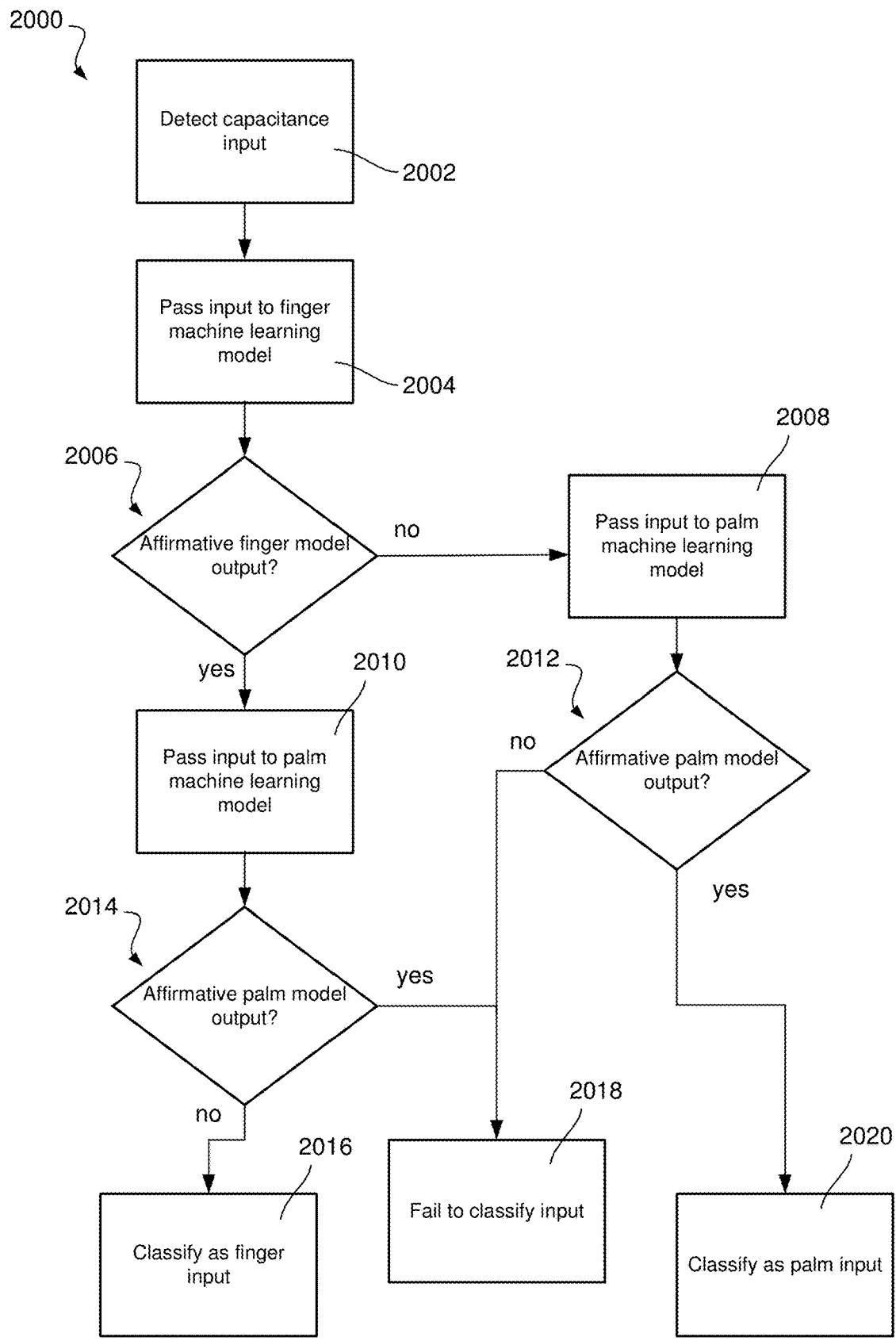
FIG. 20 depicts an example of a method of classifying an input in accordance with the disclosure.

FIG. 20 depicts an example of a decision tree 2000 for classifying a capacitance module input with machine learning models. This method 1800 may be performed based on the description of the devices, modules, and principles described in relation to FIGS. 1-17. After an input is detected 2002 by a capacitance module, the input measurements may be passed 2004 to a finger machine learning model trained on finger measurements collected during a calibration process. The machine learning model may make a first determination 2006 whether the input corresponds to a finger input. In either case, the input may be passed 2008, 2010 to a palm machine learning model. The palm machine learning model may make a second determination 2012, 2014 whether the input corresponds to a palm input. In the case of an affirmative classification by the finger model and a negative classification by the palm model, the capacitance module may classify 2016 the input as a finger input. In the case of a negative classification by the finger model and an affirmative classification by the palm model, the capacitance module may classify 2020 the input as a palm input. In the case of an affirmative classification by both the finger model and the palm model, or in the case of a negative classification by both the finger model and the palm model, the capacitance module may fail 2018 to classify the input.

In this example, the capacitance module consults two machine learning models to classify the input. In other examples, a capacitance module may consult a single machine learning model trained on a combination of inputs gathered during a calibration process. For example, a capacitance module may consult a machine learning model trained with both finger inputs and palm inputs during calibration during its classification process. Using a single machine learning model may reduce the processing involved for classifying.

Figure 21:
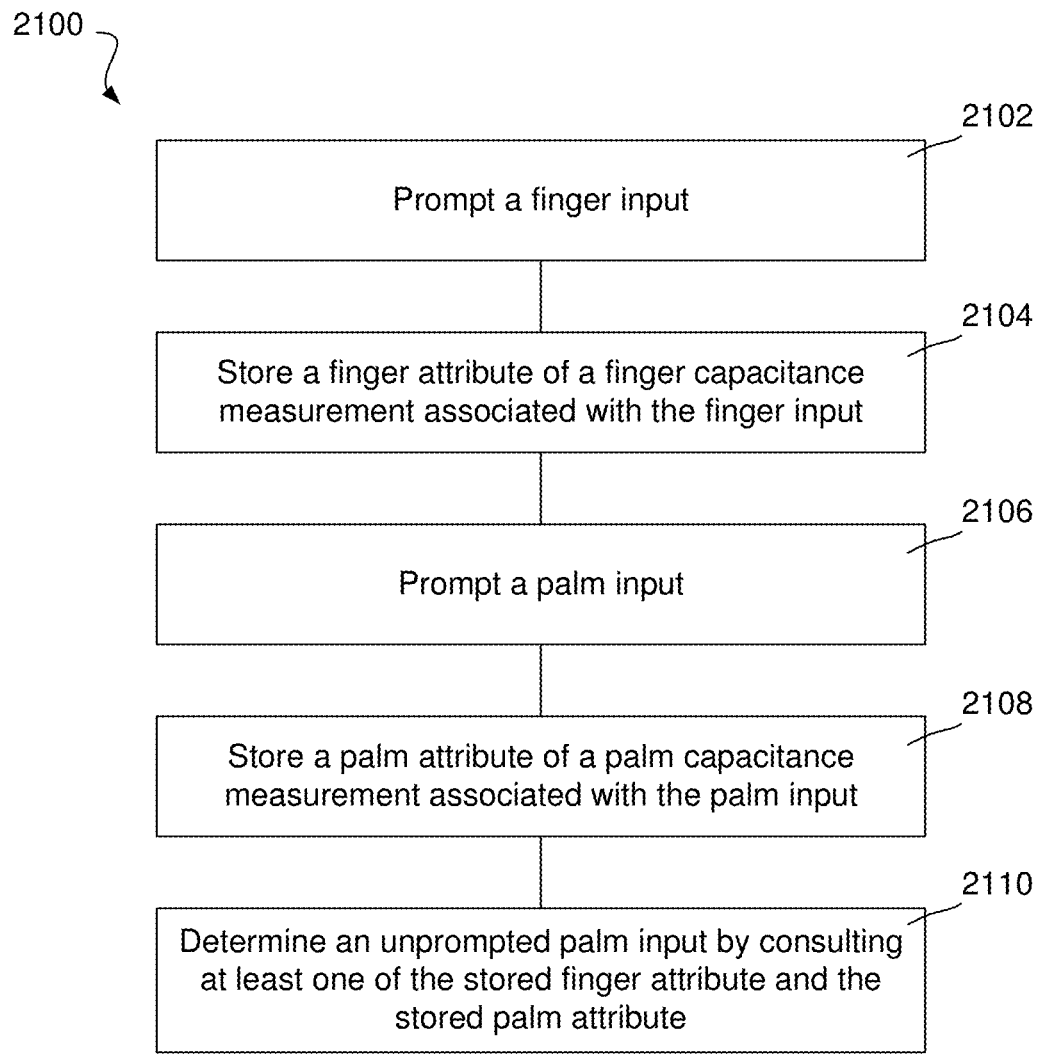
FIG. 21 depicts an example of a method for classifying a palm input in accordance with the disclosure.

FIG. 21 depicts an example of a method 2100 of classifying an unprompted input. This method 2100 may be performed based on the description of the devices, modules, and principles described in relation to FIGS. 1-20. In this example, the method 2100 includes prompting 2102 a finger input, storing 2104 a finger attribute of a finger capacitance measurement associated with the finger input, prompting 2106 a palm input, storing 2108 a palm attribute of a palm capacitance measurement associated with the palm input, and determining 2110 an unprompted palm input by consulting at least one of the stored finger attribute and the stored palm attribute.

Figure 22:
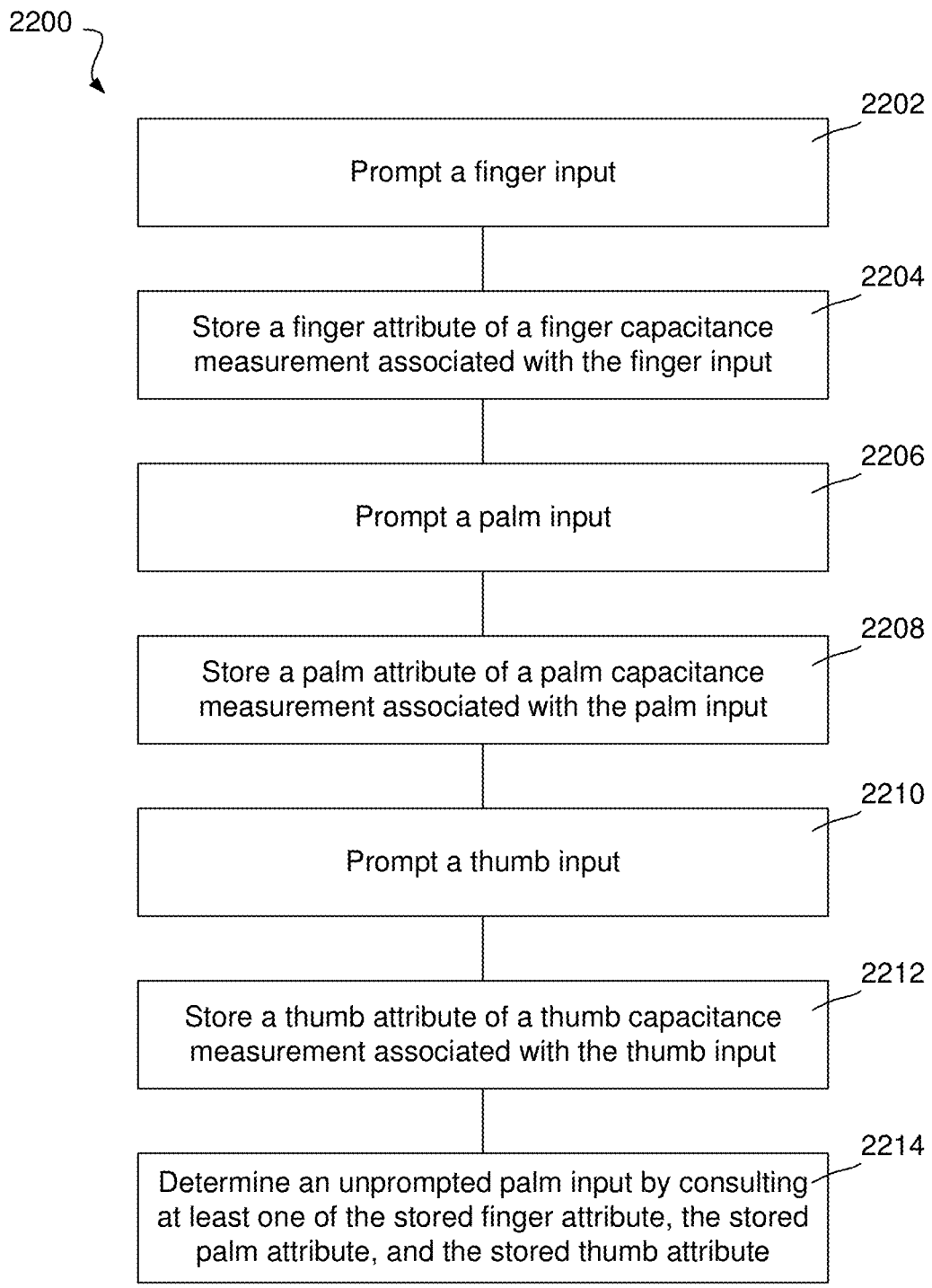
FIG. 22 depicts an example of a method for classifying a palm input in accordance with the disclosure.

FIG. 22 depicts an example of a method 2200 of classifying an unprompted input. This method 2200 may be performed based on the description of the devices, modules, and principles described in relation to FIGS. 1-20. In this example, the method 2200 includes prompting 2202 a finger input, storing 2204 a finger attribute of a finger capacitance measurement associated with the finger input, prompting 2206 a palm input, storing 2208 a palm attribute of a palm capacitance measurement associated with the palm input, prompting 2210 a thumb input, storing 2212 a thumb attribute of a thumb capacitance measurement associated with the thumb input, and determining 2214 an unprompted palm input by consulting at least one of the stored finger attribute, the stored palm attribute, and the stored thumb attribute.

Figure 23:
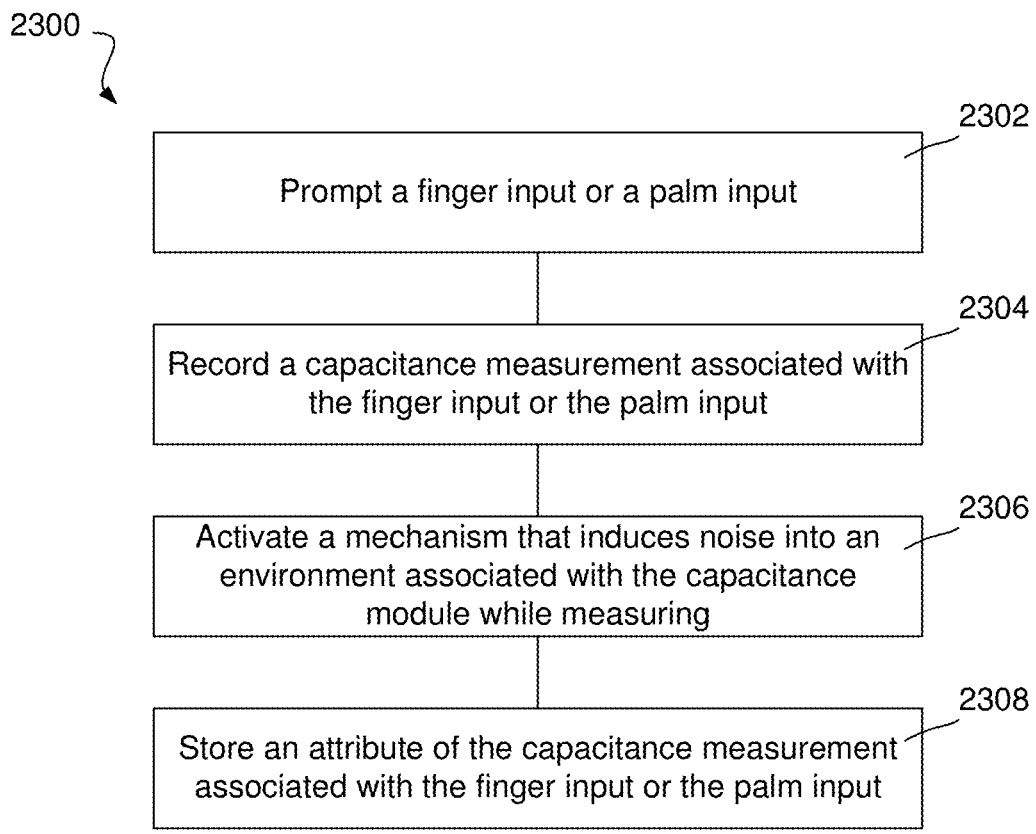
FIG. 23 depicts an example of a method of classifying an input in accordance with the disclosure.

FIG. 23 depicts an example of a method 2300 of classifying an unprompted input. This method 2300 may be performed based on the description of the devices, modules, and principles described in relation to FIGS. 1-20. In this example, the method 2300 includes prompting 2302 a finger input or a palm input, recording 2304 a capacitance measurement associated with the finger input or the palm input, activating 2306 a mechanism that induces noise into an environment associated with the capacitance module while measuring, and storing 2308 an attribute of the capacitance measurement associated with the finger input or the palm input.

In some examples, the mechanism induces noise may be an antenna, a near field antenna, a Wi-Fi antenna, a Bluetooth antenna, a haptic device, a speaker, a non-capacitance mechanism, a light emitting diode, a light source, an optical device, a vibrational device, a radar device, an ultrasonic device, another type of device, or combinations thereof. In some cases, the noise generated by the mechanism may affect the capacitance measurement. The system may store an attribute specific to when the mechanism is being activated. When classifying the type of unprompted input, the system may consult the stored attributes by comparing the recorded unprompted capacitance measurements with attributes that were taken while the mechanism was activated and when the mechanism was not activated.

For example, the user may be prompted to make a first finger input and a second finger input. While the system is recording the capacitance measurement for the second finger input, the system may also activate an antenna, which may induce an electromagnetic noise into the environment around the capacitance module. The antenna's signal may or may not affect the capacitance measurement of the second finger input. The system may store an antenna finger attribute that is different from a non-antenna finger attribute.

A non-exhaustive list of attributes that the system may store includes, but is not limited to, antenna finger attributes, antenna palm attributes, antenna thumb attributes, antenna stylus attributes, antenna proximity attributes, antenna corner attributes, antenna central region attributes, antenna typing attributes, antenna wet finger attributes, antenna wet palm attributes, antenna wet thumb attributes, antenna wet stylus attributes, antenna wet proximity attributes, antenna corner wet attributes, antenna wet central region attributes, antenna web typing attributes, non-antenna finger attributes, non-antenna palm attributes, non-antenna thumb attributes, non-antenna stylus attributes, non-antenna proximity attributes, non-antenna corner attributes, non-antenna central region attributes, non-antenna typing attributes, non-antenna wet finger attributes, non-antenna wet palm attributes, non-antenna wet thumb attributes, non-antenna wet stylus attributes, non-antenna wet proximity attributes, non-antenna corner wet attributes, non-antenna wet central region attributes, non-antenna web typing attributes, other antenna attributes, other non-antenna attributes, another non-antenna wet attributes, other antenna wet attributes, or combination of thereof.

In some cases, the system may prompt the user to make a user input while wearing a glove, while a drop of water is on the input device, while wearing a ring, while wearing a watch, while wearing a bracelet, while wearing a metallic object, while sitting in a chair, while standing, while using headphones or another wearable device, while performing a task that the user often does while providing user inputs into the user device, or combinations thereof. In some cases, rings, jewelry, watches, etc. may affect the capacitance signal. In other examples, wearing gloves may also weaken the capacitance signal. Some electronic devices that the user wears may impose an electronic frequency on the user, which may be picked up in the capacitance measurement. For example, some wearable device, pacemakers, other medical devices, and so forth may impose a frequency that may be conducted by the user's body and be detected with the capacitance sensor. Such a frequency may affect the respective stored attribute.

Figure 24:
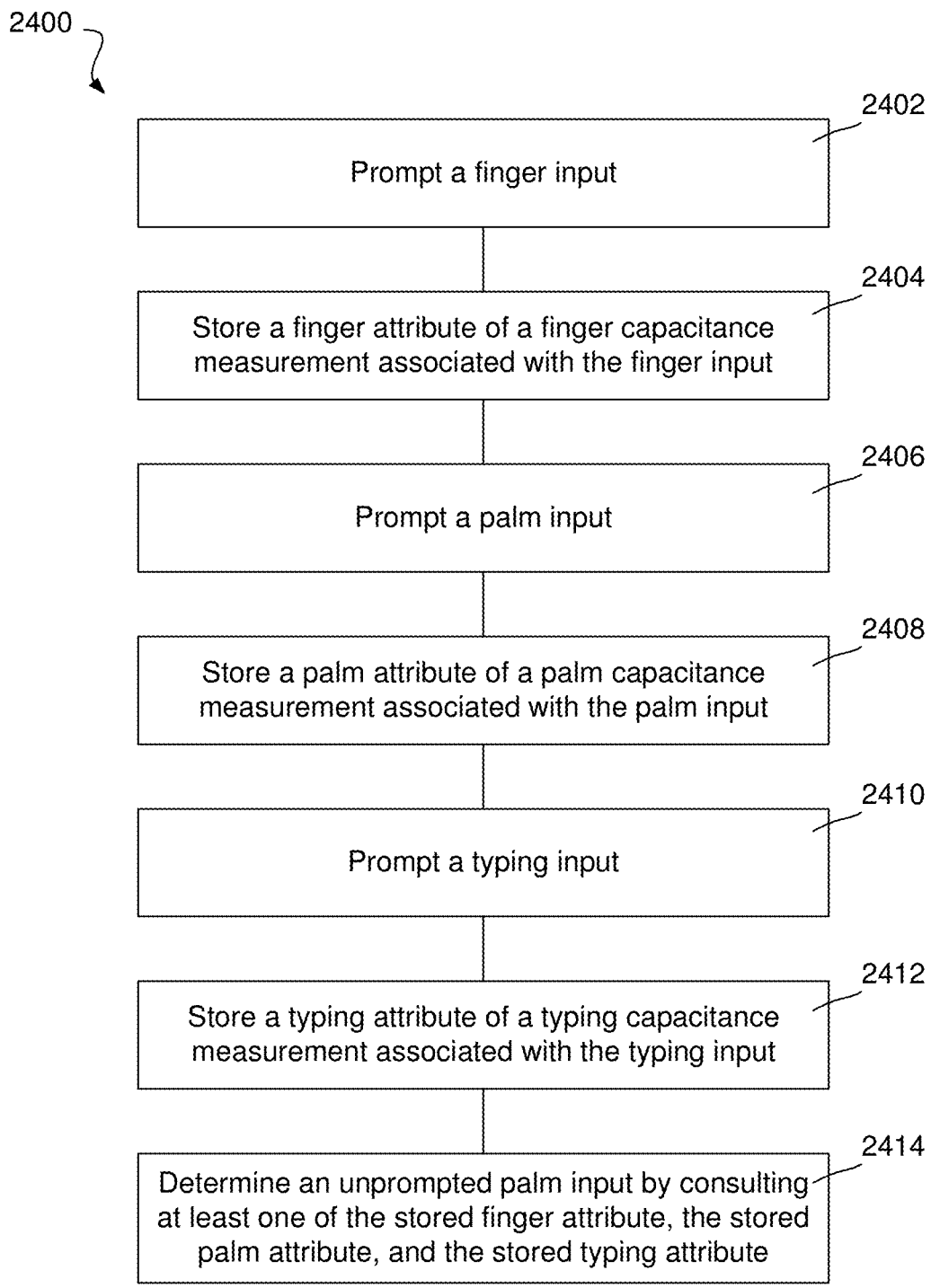
FIG. 24 depicts an example of a method of classifying an input in accordance with the disclosure.

FIG. 24 depicts an example of a method 2400 of classifying an unprompted input. This method 2400 may be performed based on the description of the devices, modules, and principles described in relation to FIGS. 1-20. In this example, the method 2400 includes prompting 2402 a finger input, storing 2404 a finger attribute of a finger capacitance measurement associated with the finger input, prompting 2406 a palm input, storing 2408 a palm attribute of a palm capacitance measurement associated with the palm input, prompting 2410 a typing input, storing 2412 a typing attribute of a thumb capacitance measurement associated with the typing input, and determining 2414 an unprompted palm input by consulting at least one of the stored finger attribute, the stored palm attribute, and the stored typing attribute.

The typing prompt may request that the user type a specific phrase on a keyboard incorporated into the electronic device. In some cases, the prompt may request that the user type a specific key or a sequence of keys. The key or sequence of keys may be located on a right-hand side of the keyboard, a left-hand side of the keyboard, or in combinations thereof. In some situations, the user may provide the prompted input with a single hand or the user may have to use both hands to comfortably provide the prompted input. In some cases, the prompt may request that the user select a virtual key incorporated into a touch screen, a touch pad, or another user input device.

While the user is providing the prompted input, the user may or may not place his or her hands on the touch pad or touch screen. In some cases, a user may have a habit of lifting his or her hands off of the touch pad while typing. In other cases, the user may have a habit of resting his or her hands on the edges of the touch pad while typing. In yet other cases, the user may have the habit of resting his or her hands over an area that encompasses more than just edges of the touch pad while typing. In yet an additional example, the user may have a habit of placing his or her hands outside of the touch pad's surface area while typing. The recorded capacitance measurements and therefore the stored attributes may reflect these typing habits of the user.

Figure 25:
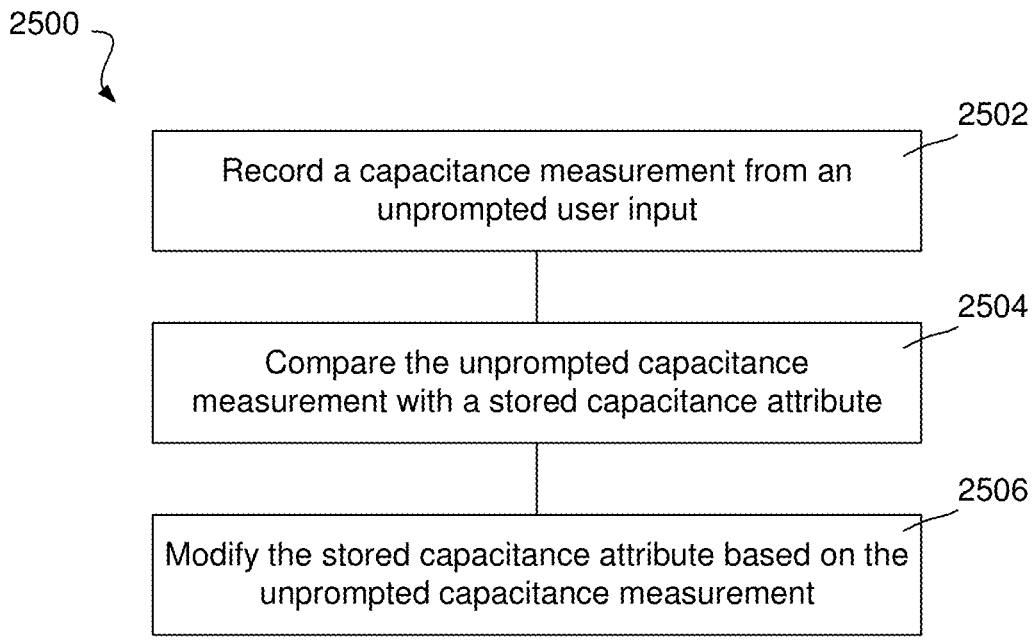
FIG. 25 depicts an example of a method of modifying a stored attribute in accordance with the disclosure.

FIG. 25 depicts an example of a method 2500 of modifying a stored capacitance attribute. This method 2500 may be performed based on the description of the devices, modules, and principles described in relation to FIGS. 1-20. In this example, the method 2500 includes recording 2502 a capacitance measurement from an unprompted user input, comparing 2504 the unprompted capacitance measurement with a stored capacitance attribute, and modifying 2506 the stored capacitance attribute based on the unprompted capacitance measurement.

The stored capacitance attribute may be any appropriate type of attribute as identified above. In some examples, based on the comparison, it may be determined that the unprompted user input has a matching characteristic to the stored attribute, is similar to a characteristic of the stored attribute, is within a standard deviation of the stored attribute, or combinations thereof. Such a comparison may result in classifying the unprompted user input as a particular type of user input. A non-exhaustive list of types of user inputs may include, but are not limited to, intentional inputs, accidental inputs, palm inputs, finger inputs, thumb inputs, stylus inputs, wet inputs, glove inputs, proximity inputs, other types of inputs, or combinations thereof.

In some cases, the stored capacitance attribute may be modified based on a single unprompted capacitance measurement. In other examples, multiple unprompted capacitance measurements may be collected and/or analyzed to determine a collective unprompted attribute. This unprompted attribute may be compared with the stored capacitance attribute. In cases where the stored capacitance attribute is different than the unprompted attribute, the unprompted attribute may be used to modify the stored capacitance attribute.

In some examples, only those unprompted attributes that are associated with user inputs of the same classification are compared and/or used to modify the stored capacitance attribute. For example, just those attributes associated with unprompted finger user inputs may be used to modify a stored finger attribute. In other examples, a characteristic of an unprompted user input may be used to modify stored attributes associated with types of user inputs. For example, an attribute associated with an unprompted finger input may be used to modify a finger attribute, a palm attribute, a thumb attribute, a stylus attribute, a wet attribute, a proximity attribute, another type of attribute, or combination thereof.

Figure 26:
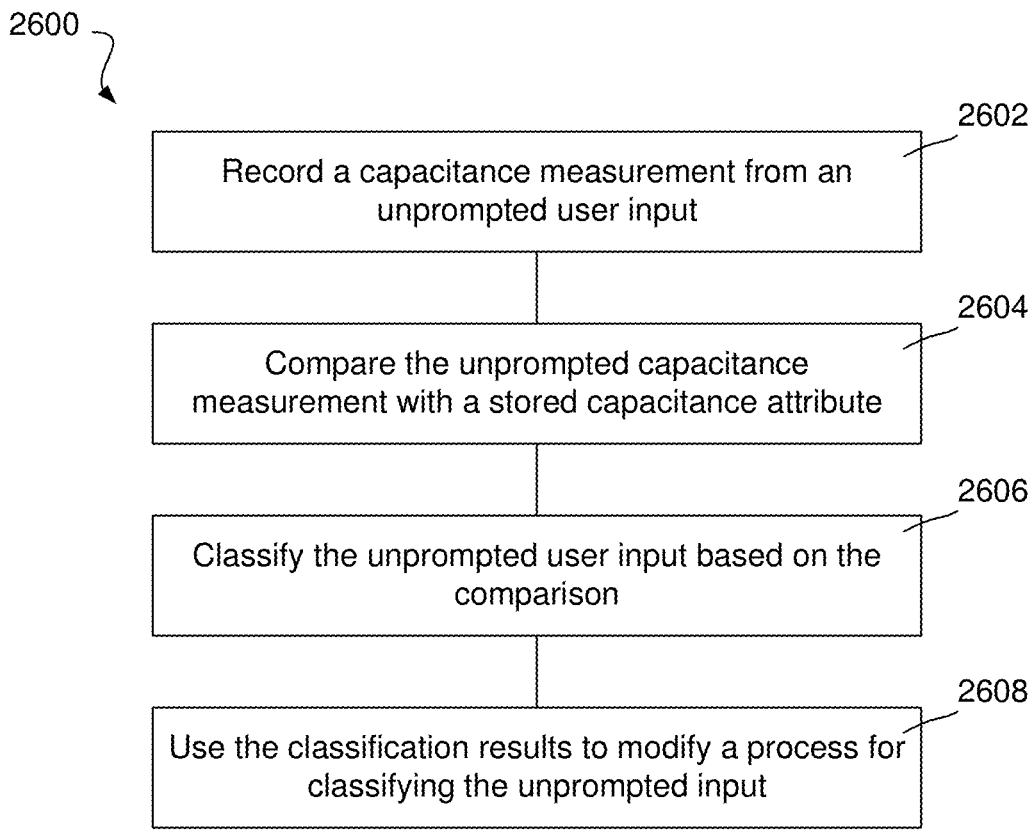
FIG. 26 depicts an example of a method of modifying a classification process in accordance with the disclosure.

FIG. 26 depicts an example of a method 2600 of modifying a classification process. This method 2600 may be performed based on the description of the devices, modules, and principles described in relation to FIGS. 1-20. In this example, the method 2600 includes recording 2602 a capacitance measurement from an unprompted user input, comparing 2604 the unprompted capacitance measurement with a stored capacitance attribute, classifying 2606 the unprompted user input based on the comparison, and using 2608 the classification results to modify a process for classifying the unprompted input.

The process for classifying an unprompted input may include comparing attributes from the unprompted input with a stored attribute, comparing characteristics of the stored attribute with a characteristic of the unprompted input, running an algorithm, running a calculation, another task, or combination thereof.

Modifying the process for classifying the unprompted user inputs may include a machine learning process, a k-nearest-neighbors model, a logistic regression model, a decision tree model, a random forest model, a gradient boosting machine, a support vector machine, a neural network, another machine learning model, or combinations thereof.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A capacitance module, comprising:
   a set of electrodes;
   a controller in communication with the set of electrodes;
   memory in communication with the controller;
   wherein the memory includes programmed instructions that cause the controller, when executed, to:
   prompt a finger input;
   store a finger attribute of a finger capacitance measurement associated with the finger input;
   prompt a palm input;
   store a palm attribute of a palm capacitance measurement associated with the palm input; and
   determine an unprompted palm input by consulting at least one of the stored finger attribute and the stored palm attribute;
   wherein the finger attribute is selected from the group consisting of a finger dimension attribute, a finger movement attribute, a finger signal attribute, and a finger image attribute; and
   wherein the palm attribute is selected from the group consisting of a palm dimension attribute, a palm movement attribute, a palm signal attribute, and a palm image attribute.

2. The capacitance module of claim 1, the programmed instructions further cause the controller to:
   prompt a thumb input; and
   store a thumb attribute of a thumb capacitance measurement associated with the thumb input.

3. The capacitance module of claim 2, wherein determining the unprompted palm input includes consulting at least one of the stored finger attribute, the thumb attribute, and the stored palm attribute.

4. The capacitance module of claim 2, wherein the thumb attribute is classified as a finger attribute.

5. The capacitance module of claim 2, wherein the thumb attribute is used to modify the finger attribute.

6. The capacitance module of claim 1, wherein the programmed instructions further cause the controller to:
   prompt a proximity input; and
   store a proximity capacitance attribute of a proximity capacitance measurement associated with the proximity input;
   wherein determining the unprompted palm input includes consulting at least one of the stored finger attribute, the proximity attribute, and the stored palm attribute.

7. The capacitance module of claim 6, wherein the proximity prompt is selected from the group consisting of a finger proximity input, a thumb proximity input, and a palm proximity input.

8. The capacitance module of claim 1, wherein the programmed instructions further cause the controller to:
   prompt a subsequent finger input; and
   use a subsequent finger attribute of a subsequent finger capacitance measurement associated with the prompted subsequent finger input to modify the stored finger input.

9. The capacitance module of claim 1, wherein the programmed instructions further cause the controller to:
   prompt a subsequent palm input; and
   use a subsequent palm attribute of a subsequent palm capacitance measurement associated with the prompted subsequent palm input to modify the stored palm input.

10. The capacitance module of claim 1, wherein the finger dimension attribute is a finger length.

11. The capacitance module of claim 1, wherein the finger dimension attribute is a finger width.

12. The capacitance module of claim 1, wherein the finger dimension attribute is a finger surface area.

13. The capacitance module of claim 1, wherein the palm dimension attribute is a palm length.

14. The capacitance module of claim 1, wherein the palm dimension attribute is a palm width.

15. The capacitance module of claim 1, wherein the palm dimension attribute is a palm surface area.

16. The capacitance module of claim 1, wherein the programmed instructions further cause the controller to:
    prompt a typing input; and
    store a typing attribute of a typing capacitance measurement associated with the typing input.

17. The capacitance module of claim 16, wherein determining the unprompted palm input includes consulting at least one of the stored finger attribute, the stored typing attribute, and the stored palm attribute.

18. The capacitance module of claim 1, wherein the programmed instructions further cause the controller to:
    record a capacitance measurement associated with the finger input or the palm input; and
    activate a mechanism that induces noise onto an environment associated with the capacitance module while measuring.

19. A method for determining a palm input on a capacitance module, comprising:
    prompting a finger input;
    storing a finger attribute of a finger capacitance measurement associated with the finger input;
    prompting a palm input;
    storing a palm attribute of a palm capacitance measurement associated with the palm input; and
    determining an unprompted palm input by consulting at least one of the stored finger attribute and the stored palm attribute;
    wherein the finger attribute is selected from the group consisting of a finger dimension attribute, a finger movement attribute, a finger signal attribute, and a finger image attribute; and
    wherein the palm attribute is selected from the group consisting of a palm dimension attribute, a palm movement attribute, a palm signal attribute, and a palm image attribute.

20. A computer-program product for determining a palm input on a capacitance module; the computer-program product comprising a non-transitory computer-readable medium storing instructions executable by a controller to:
    prompt a finger input;
    store a finger attribute of a finger capacitance measurement associated with the finger input;

prompt a palm input;
store a palm attribute of a palm capacitance measurement associated with the palm input; and
determine an unprompted palm input by consulting at least one of the stored finger attribute and the stored palm attribute;
wherein the finger attribute is selected from the group consisting of a finger dimension attribute, a finger movement attribute, a finger signal attribute, and a finger image attribute; and
wherein the palm attribute is selected from the group consisting of a palm dimension attribute, a palm movement attribute, a palm signal attribute, and a palm image attribute.

* * * * *